(12) United States Patent
Kim et al.

(10) Patent No.: US 11,719,976 B2
(45) Date of Patent: Aug. 8, 2023

(54) DISPLAY APPARATUS AND METHOD FOR MANUFACTURING THE SAME

(71) Applicant: SAMSUNG ELECTRONICS CO., LTD., Suwon-si (KR)

(72) Inventors: Daesik Kim, Suwon-si (KR); Kyonghyong Kim, Suwon-si (KR); Doyoung Kwak, Suwon-si (KR); Jeongtaek Kim, Suwon-si (KR); Jongil Kim, Suwon-si (KR); Yasuhiro Nishida, Suwon-si (KR); Inyoul Seo, Suwon-si (KR); Byunghun Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/895,538

(22) Filed: Aug. 25, 2022

(65) Prior Publication Data
US 2023/0126774 A1    Apr. 27, 2023

Related U.S. Application Data

(63) Continuation of application No. PCT/KR2022/011932, filed on Aug. 10, 2022.

(30) Foreign Application Priority Data

Oct. 27, 2021 (KR) .......................... 10-2021-0144567

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01)

(58) Field of Classification Search
CPC ......... G02F 1/133603; G02F 1/133607; G02F 1/133605
See application file for complete search history.

(56) References Cited

U.S. PATENT DOCUMENTS 10,203,086 B2    2/2019 Kang
10,355,181 B2    7/2019 Yamada
(Continued)

FOREIGN PATENT DOCUMENTS

KR    10-2008-0071735 A    8/2008
KR    10-1144635 B1    5/2012
(Continued)

OTHER PUBLICATIONS

International Search Report (PCT/ ISA/ 210), dated Nov. 28, 2022, issued by the International Searching Authority, Application No. PCT/ KR2022/ 011932.
(Continued)

*Primary Examiner* — Mary Ellen Bowman
(74) *Attorney, Agent, or Firm* — Sughrue Mion, PLLC

(57) ABSTRACT

A display apparatus includes a liquid crystal panel, and a backlight unit configured to emit light to the liquid crystal panel. The backlight unit includes a substrate, a light emitting diode (LED) provided on the substrate and configured to emit light, and a refractive cover formed by being provided at a plurality of points separated from each other, and configured to enclose the LED.

14 Claims, 24 Drawing Sheets

(56) References Cited

U.S. PATENT DOCUMENTS

| | | | |
|---|---|---|---|
| 10,553,763 B2* | 2/2020 | Yamada | H01L 33/58 |
| 10,948,163 B2 | 3/2021 | Lee | |
| 2008/0079018 A1* | 4/2008 | Kimura | G02F 1/133608 |
| | | | 257/E33.072 |
| 2009/0316402 A1* | 12/2009 | Fan | G02F 1/133605 |
| | | | 362/241 |
| 2011/0164203 A1* | 7/2011 | Kimura | G02B 6/003 |
| | | | 349/62 |
| 2012/0147295 A1* | 6/2012 | Kasano | G02F 1/133605 |
| | | | 257/E33.072 |
| 2012/0169791 A1* | 7/2012 | Whitehead | G02F 1/133606 |
| | | | 345/690 |
| 2013/0148036 A1* | 6/2013 | Shimizu | G02F 1/133605 |
| | | | 348/739 |
| 2014/0092584 A1* | 4/2014 | Ono | H01L 33/58 |
| | | | 362/296.01 |
| 2014/0160733 A1* | 6/2014 | Ono | G02F 1/133605 |
| | | | 362/97.1 |
| 2016/0291235 A1* | 10/2016 | Oh | G02F 1/133603 |
| 2019/0227216 A1* | 7/2019 | Qiu | G02F 1/133602 |
| 2020/0133076 A1* | 4/2020 | Teragawa | G02F 1/133611 |
| 2022/0206337 A1* | 6/2022 | Kim | G02F 1/133605 |
| 2022/0390797 A1* | 12/2022 | Yamazaki | F21V 7/28 |

FOREIGN PATENT DOCUMENTS

| | | |
|---|---|---|
| KR | 10-2017-0096370 A | 8/2017 |
| KR | 10-2019-0010478 A | 1/2019 |
| KR | 10-2019-0090332 A | 8/2019 |
| KR | 10-2019-0143243 A | 12/2019 |
| KR | 10-2023-0014508 A | 1/2023 |

OTHER PUBLICATIONS

Written Opinion (PCT/ISA/237), dated Nov. 28, 2022, issued by the International Searching Authority, Application No. PCT/KR2022/011932.

* cited by examiner

FIG. 11

| DIRECTIVITY ANGLE (LED EMISSION) | REFRACTIVE SURFACE | CHANGE IN EXIT ANGLE WITH INCREASE IN DIRECTIVITY ANGLE |
|---|---|---|
| $0 \sim \theta_a$ | FIRST REFRACTIVE SURFACE(181) | INCREASE |
| $\theta_a \sim \theta_{b1}$ | SECOND REFRACTIVE SURFACE(182) | DECREASE UNTIL NON-REFRACTIVE POINT (182b) |
| $\theta_{b1} \sim \theta_{b2}$ | SECOND REFRACTIVE SURFACE(182) | INCREASE |
| $\theta_{b2} \sim 90°$ | THIRD REFRACTIVE SURFACE(183) | DECREASE |

DISPLAY APPARATUS AND METHOD FOR MANUFACTURING THE SAME

CROSS-REFERENCE TO RELATED APPLICATION

This application is a bypass continuation Application of International Application No. PCT/KR2022/011932, filed on Aug. 10, 2022, in the Korean Intellectual Property Receiving Office, which is based on and claims priority to Korean Patent Application No. 10-2021-0144567 filed on Oct. 27, 2021, the disclosures of which are incorporated herein by reference in their entireties.

BACKGROUND

1. Field

The disclosure relates generally to a display apparatus including a backlight unit and a liquid crystal panel.

2. Discussion of Related Art

In general, display apparatuses are a type of output device for displaying obtained or stored electrical information for the user by converting the electrical information to visual information, and are used in various fields such as homes or work places.

There are many different display apparatuses such as monitor devices connected to personal computers (PCs) or server computers, portable computer systems, Global Positioning System (GPS) terminals, general television sets, Internet protocol televisions (IPTVs), portable terminals, such as smart phones, tablet PCs, personal digital assistants (PDAs), and cellular phones, any other display device for reproducing images like advertisements or films, or other various kinds of audio/video systems.

The display apparatus may include a backlight unit (BLU) for providing light to a liquid crystal panel. The BLU may include a plurality of point light sources, each of which is able to emit light separately.

The thickness of the display apparatus is becoming thinner. Hence, an optical distance (OD) for converting point light to surface light is decreasing. Maintaining a level and uniformity of brightness of the display apparatus is required even with the decreasing optical distance.

SUMMARY

Provided is a display apparatus including a light emitting diode (LED) with a distributed Bragg reflector (DBR) layer arranged on top of the LED in order to have light emission distribution at high directivity angles, and a refractive cover covering the LED to protect the LED and enhance light extraction efficiency and light diffusion performance of the LED.

Further provided is a display apparatus having a refractive cover formed by dispensing a transparent material in a liquid state at a plurality of points and hardening the transparent material dispensed, thereby having reduced material costs and improved productivity.

Additionally provided is a display apparatus including a backlight unit that uses a refractive cover to provide uniform backlight without mura even with a short optical distance (OD).

Additional aspects will be set forth in part in the description which follows and, in part, will be apparent from the description, or may be learned by practice of the presented embodiments.

According to an aspect of the disclosure, a display apparatus may include a liquid crystal panel, and a backlight unit configured to emit light to the liquid crystal panel. The backlight unit may include a substrate, a light emitting diode (LED) provided on the substrate and configured to emit light, and a refractive cover formed by being provided at a plurality of points separated from each other, and configured to enclose the LED.

The refractive cover may be further formed by dispensing and hardening a transparent material in a liquid state at the plurality of points.

The transparent material may include a refraction index greater than air.

The backlight unit may further include a reflector provided along at least one edge of the refractive cover on the substrate.

The reflector may include a first reflection pattern formed by applying a photo solder resist (PSR) on the substrate, and a second reflection pattern formed by applying the PSR on the first reflection pattern.

The reflector may include an inclined surface with decreasing height toward the LED such that the reflector is configured to reflect light emitted from the LED, the light emitted from the LED including a directivity angle equal to or larger than a certain angle in a forward direction of the substrate.

A maximum height of the reflector may be equal to or less than a tenth of height of the refractive cover at a central axis of the LED.

The display apparatus may include a plurality of LEDs provided on a top surface of the substrate to form an array.

A first distance between first neighboring LEDs of the plurality of LEDs in a first direction may be different from a second distance between second neighboring LEDs of the plurality of LEDs in a second direction perpendicular to the first direction.

The refractive cover may be rotationally asymmetric such that a diffusion ratio of light emitted from the LED in a first direction is different from a diffusion ratio in a second direction perpendicular to the first direction.

The refractive cover may include a first refractive surface including an increasing height that increases toward a central axis of the LED, and a second refractive surface configured to be connected to the first refractive surface and including a decreasing height that decreases toward the central axis of the LED.

A ray including a highest light intensity among rays emitted from the LED may penetrate the second refractive surface.

A ray including half of a highest light intensity among rays emitted from the LED may penetrate the first refractive surface.

The LED may include a distributed Bragg reflector (DBR) layer provided on top of the LED.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a table for describing changes in exit angle with the increase in directivity angle resulting from a refractive cover refracting light emitted from an LED, according to an embodiment of the disclosure;

DETAILED DESCRIPTION

Figure 1:
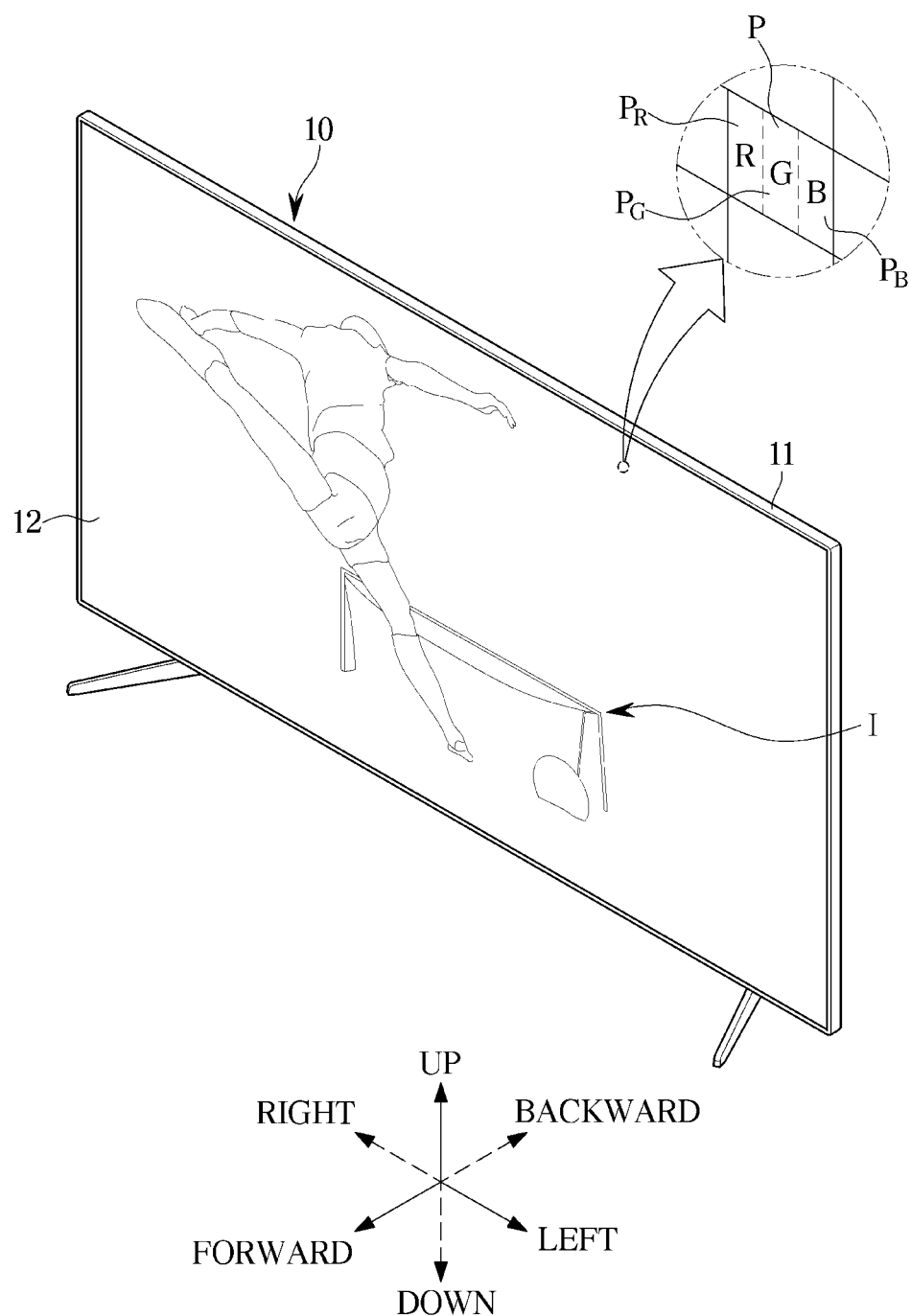
FIG. 1 is a diagram of an exterior of a display apparatus, according to an embodiment of the disclosure.

Embodiments and features as described and illustrated in the disclosure are merely examples, and there may be various modifications replacing the embodiments and drawings at the time of filing this application.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "forward (or front)", "rearward (or behind)", "left", and "right" as herein used are defined with respect to the drawings, but the terms may not restrict the shape and position of the respective components.

Reference will now be made in detail to embodiments of the disclosure, which are illustrated in the accompanying drawings, wherein like reference numerals refer to the like elements throughout.

FIG. 1 is a diagram of an exterior of a display apparatus, according to an embodiment of the disclosure.

Referring to FIG. 1, a display apparatus 10 is a device that is able to process image signals received from the outside and visually present the processed image. In the following description, it may be assumed that the display apparatus 10 is a television (TV), but embodiments of the disclosure are not limited thereto. For example, the display apparatus 10 may be implemented in various forms, such as a monitor, a portable multimedia device, a portable communication device, and any device capable of visually presenting images, without being limited thereto.

The display apparatus 10 may be a large format display (LFD) installed outdoors such as on a rooftop of a building or at a bus stop. The display apparatus 10 is not, however, exclusively installed outdoors, but may be installed at any place, even indoors with a lot of foot traffic, such as at subway stations, shopping malls, theaters, offices, stores, etc.

The display apparatus 10 may receive contents including video and audio signals from various content sources and output video and audio corresponding to the video and audio signals. For example, the display apparatus 10 may receive content data through a broadcast receiving antenna or a cable, receive content data from a content reproducing device, or receive content data from a content providing server of a content provider.

As shown in FIG. 1, the display apparatus 10 may include a main body 11 and a screen 12 for displaying an image I.

The main body 11 forms the exterior of the display apparatus 10, and components for the display apparatus 10 to display the image I or perform many different functions may be included in the main body 11. Although the main body 11 of FIG. 1 is shaped like a flat plate, it is not limited thereto. For example, the main body 11 may have the form of a curved plate.

The screen 12 may be formed on the front of the main body 11 for displaying the image I. For example, the screen 12 may display still images or moving images. The screen 12 may also display two dimensional (2D) plane images, or three dimensional (3D) stereographic images using parallax of both eyes of the user.

The screen 12 may include a non-self-light-emitting panel (e.g., a liquid crystal panel) capable of passing or blocking light emitted by e.g., a backlight unit (BLU).

A plurality of pixels P are formed on the screen 12, and the image I displayed on the screen 12 may be formed by the light emitted by each of the plurality of pixels P. For example, the light emitted by each of the plurality of pixels P may be combined like a mosaic into the image I on the screen 12.

Each of the plurality of pixels P may emit light in various colors and brightnesses. Each of the pixels P may include subpixels PR, PG, and PB to emit different colors of light.

The subpixels PR, PG, and PB may include a red subpixel PR to emit red light, a green subpixel PG to emit green light, and blue subpixel PB to emit blue light. The red light may be defined as having wavelengths in the range of about 620 to 750 nm, where 1 nm is a billionth of a meter. The green light may have wavelengths in the range of about 495 to 570 nm. The blue light may have wavelengths in the range of about 450 to 495 nm.

By combinations of the red light of the red subpixel $P_R$, the green light of the green subpixel $P_G$, and the blue light of the blue subpixel $P_B$, each of the plurality of pixels P may emit various brightnesses and colors of light.

Figure 2:
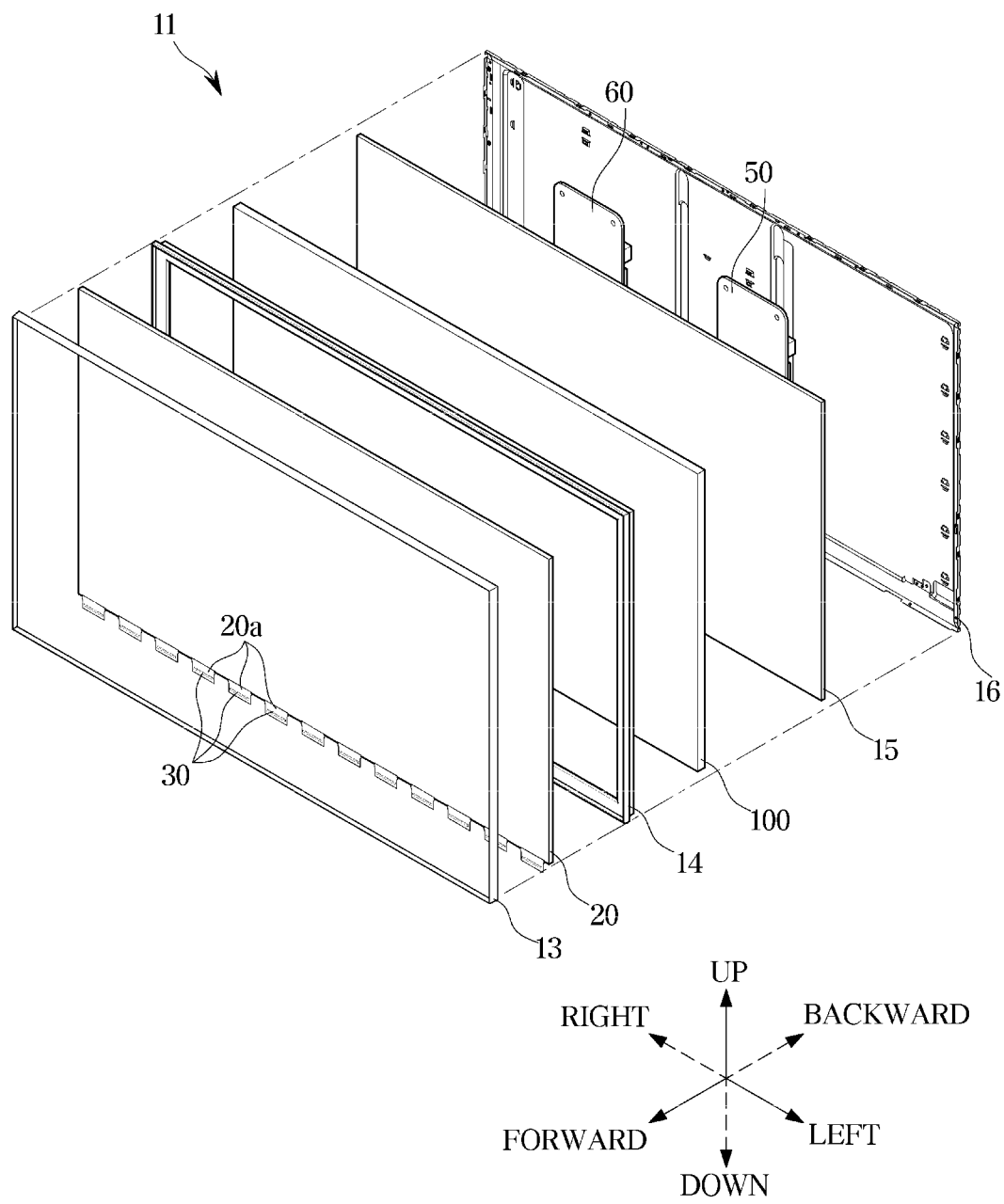
FIG. 2 is a diagram of a structure of a display apparatus, according to an embodiment of the disclosure.
Figure 3:
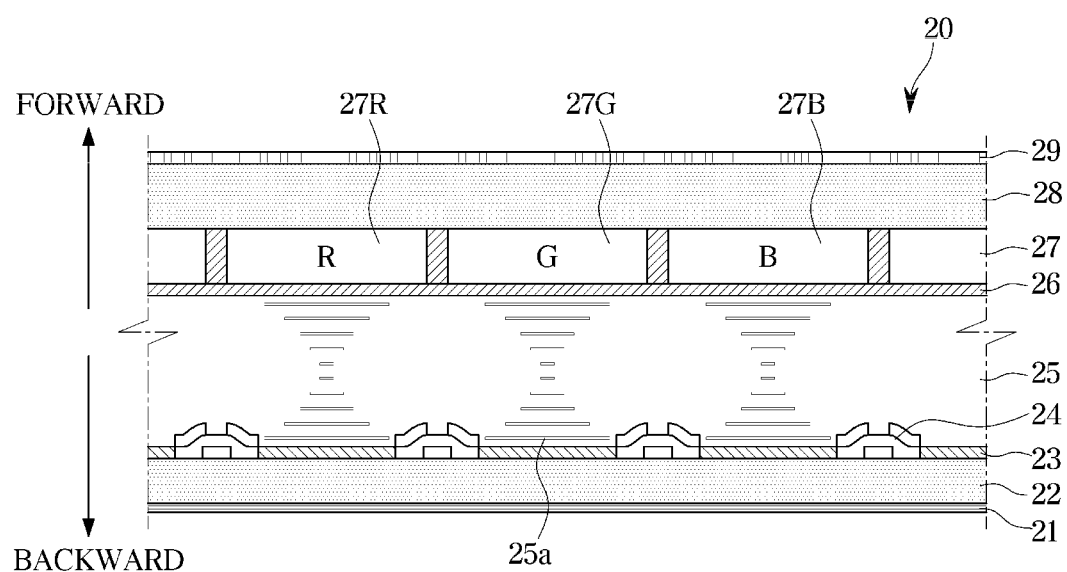
FIG. 3 is a diagram of a liquid crystal panel included in a display apparatus, according to an embodiment of the disclosure.

FIG. 2 is a diagram of a structure of a display apparatus 10, according to an embodiment of the disclosure. FIG. 3 is a diagram of a liquid crystal panel included in the display apparatus 10, according to an embodiment of the disclosure.

As shown in FIG. 2, the main body 11 may contain many different kinds of components to create the image I on the screen S.

For example, a BLU 100, which is a surface light source, a liquid crystal panel 20 for blocking or passing the light emitted from the BLU 100, a control assembly 50 for controlling operations of the BLU 100 and the liquid crystal panel 20, and a power assembly 60 for supplying power to the BLU 100 and the liquid crystal panel 20 are equipped in the main body 11. Furthermore, the main body 11 may include a bezel 13, a frame middle mold 14, a bottom chassis 15, and a rear cover 16 to support the liquid crystal panel 20, the BLU 100, the control assembly 50, and the power assembly 60.

The BLU 100 may include point light sources for emitting monochromatic light or white light. The BLU 100 may refract, reflect, and diffuse the light emitted from the point light sources to convert the light to uniform surface light. In this way, the BLU 100 may emit the uniform surface light in a forward direction by refracting, reflecting and diffusing the light emitted from the point light sources.

The BLU 100 will now be described in more detail.

The liquid crystal panel 20 is arranged in front of the BLU 100 for blocking or passing the light emitted from the BLU 100 to produce the image I.

The front surface of the liquid crystal panel 20 may form the screen 12 of the aforementioned display apparatus 10, and the liquid crystal panel 20 may include the plurality of pixels P. The liquid crystal panel 20 may block or pass the light from the BLU 100 separately. The light that has passed by the plurality of pixels P may form the image I displayed on the screen 12.

For example, as shown in FIG. 3, the liquid crystal panel 20 may include a first polarizer film 21, a first transparent substrate 22, a pixel electrode 23, a thin film transistor (TFT) 24, a liquid crystal layer 25, a common electrode 26, a color filter 27, a second transparent substrate 28, and a second polarizer film 29.

The first transparent substrate 22 and the second transparent substrate 28 may securely support the pixel electrode 23, the TFT 24, the liquid crystal layer 25, the common electrode 26, and the color filter 27. The first and second transparent substrates 22 and 28 may be formed of tempered glass or transparent resin.

The first polarizer film 21 and the second polarizer film 29 are arranged on outer sides of the first and second transparent substrates 22 and 28. The first and second polarizer films 21 and 29 may each pass particularly polarized light while blocking (reflecting or absorbing) differently polarized light. For example, the first polarizer film 21 may pass polarized light of a first direction while blocking (reflecting or absorbing) differently polarized light. Furthermore, the second polarizer film 29 may pass polarized light of a second direction while blocking (reflecting or absorbing) differently polarized light. The first and second directions may be perpendicular to each other. As a result, the polarized light that has passed the first polarizer film 21 may not directly pass the second polarizer film 29.

The color filter 27 may be arranged on the inner side of the second transparent substrate 28. The color filter 27 may include, for example, a red color filter 27R for passing red light, a green color filter 27G for passing green light, and a blue color filter 27B for passing blue light. Furthermore, the red, green, and blue color filters 27R, 27G, and 27B may be arranged side by side. An area occupied by the color filter 27 corresponds to the pixel P as described above. An area occupied by the red color filter 27R corresponds to the red subpixel PR; an area occupied by the green color filter 27G corresponds to the green subpixel PG; an area occupied by the blue color filter 27B corresponds to the blue subpixel PB.

The pixel electrode 23 may be arranged on the inner side of the first transparent substrate 22, and the common electrode 26 may be arranged on the inner side of the second transparent substrate 28. The pixel electrode 23 and the common electrode 26 are formed of a conductive metal material, and may produce an electric field to change arrangement of liquid crystal molecules 115a that form the liquid crystal layer 25, which will be described below.

The thin film transistor (TFT) 24 is arranged on the inner side of the second transparent substrate 22. The TFT 24 may be turned on (closed) or turned off (opened) by image data provided from a panel driver 30 Furthermore, depending on whether the TFT 24 is turned on (closed) or turned off (opened), an electric field may be formed or removed from between the pixel electrode 23 and the common electrode 26.

The liquid crystal layer 25 may be formed between the pixel electrode 23 and the common electrode 26 and filled with liquid crystal molecules 25a. The liquid crystals may be in an intermediate state between solid (crystal) and fluid. The liquid crystals may reveal an optical property according to a change in electric field. For example, the liquid crystal may have varying directions of arrangement of molecules that form the liquid crystal, according to a change in electric field. Consequently, the optical property of the liquid crystal layer 25 may be changed according to whether there is an electric field passing the liquid crystal layer 25. For example, the liquid crystal layer 25 may rotate a polarization direction of light around a light axis depending on whether there is an electric field. Hence, the polarized light that has passed the first polarizer film 21 may have a rotating polarization direction while passing the liquid crystal layer 25, and may pass the second polarizer film 29.

On one side of the liquid crystal panel 20, provided are a cable 20a for transmitting image data to the liquid crystal panel 20 and a display driver integrated circuit (DDI) 30 (hereinafter, called a 'panel driver') for processing digital image data to output an analog image signal.

The cable 20a may electrically connect between the control assembly 50, the power assembly 60 and the panel driver 30 and further between the panel driver 30 and the liquid crystal panel 20. The cable 20a may include, for example, a flexible flat cable that is bendable or a film cable.

The panel driver 30 may receive image data and power from the control assembly 50 and the power assembly 60 through the cable 20a. The panel driver 30 may also provide image data and a driving current to the liquid crystal panel 20 through the cable 20a.

Furthermore, the cable 20a and the panel driver 30 may be integrally implemented as a film cable, a chip on film (COF), a table carrier package (TCP), etc. In other words, the panel driver 30 may be arranged on the cable 20a. It is not, however, limited thereto, and the panel driver 30 may be arranged on the liquid crystal panel 20.

The control assembly 50 may include a control circuit for controlling operations of the liquid crystal panel 20 and the BLU 100. For example, the control circuit may process a video signal and/or an audio signal received from an external content source. The control circuit may transmit image data to the liquid crystal panel 20, and transmit dimming data to the BLU 100.

The power assembly 60 may include a power circuit for supplying power to the liquid crystal panel 20 and the BLU 100. The power circuit may supply power to the control assembly 50, the BLU 100, and the liquid crystal panel 20.

The control assembly 50 and the power assembly 60 may be implemented with printed circuit boards (PCBs) and various circuits mounted on the PCBs. For example, the power circuit may include a power circuit board, and a capacitor, a coil, a resistor, a processor, etc., which are mounted on the power circuit board. Furthermore, the control circuit may include a control circuit board with a memory and a processor mounted thereon.

Figure 4:
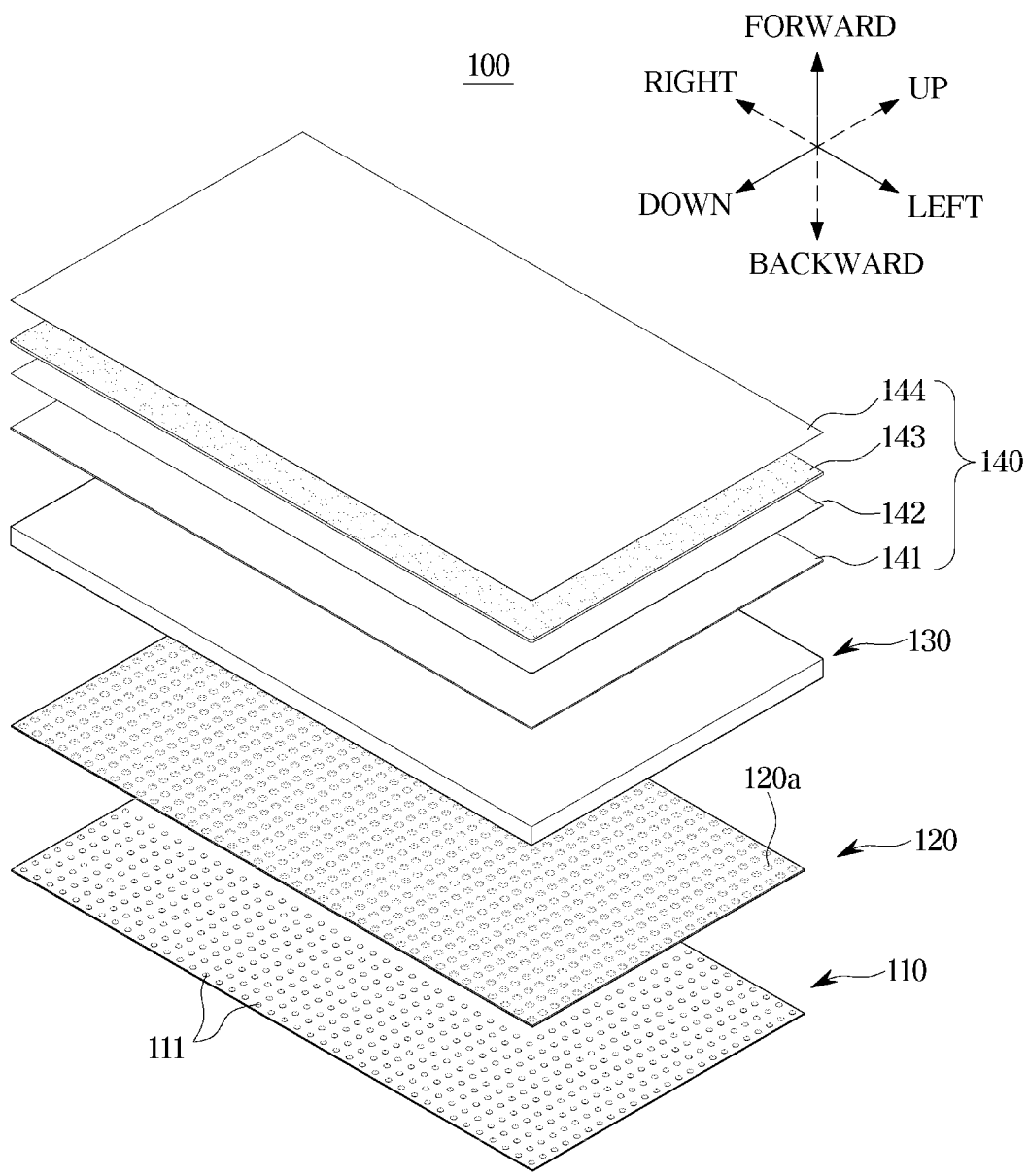
FIG. 4 is a diagram of a backlight unit included in a display apparatus, according to an embodiment of the disclosure.
Figure 5:
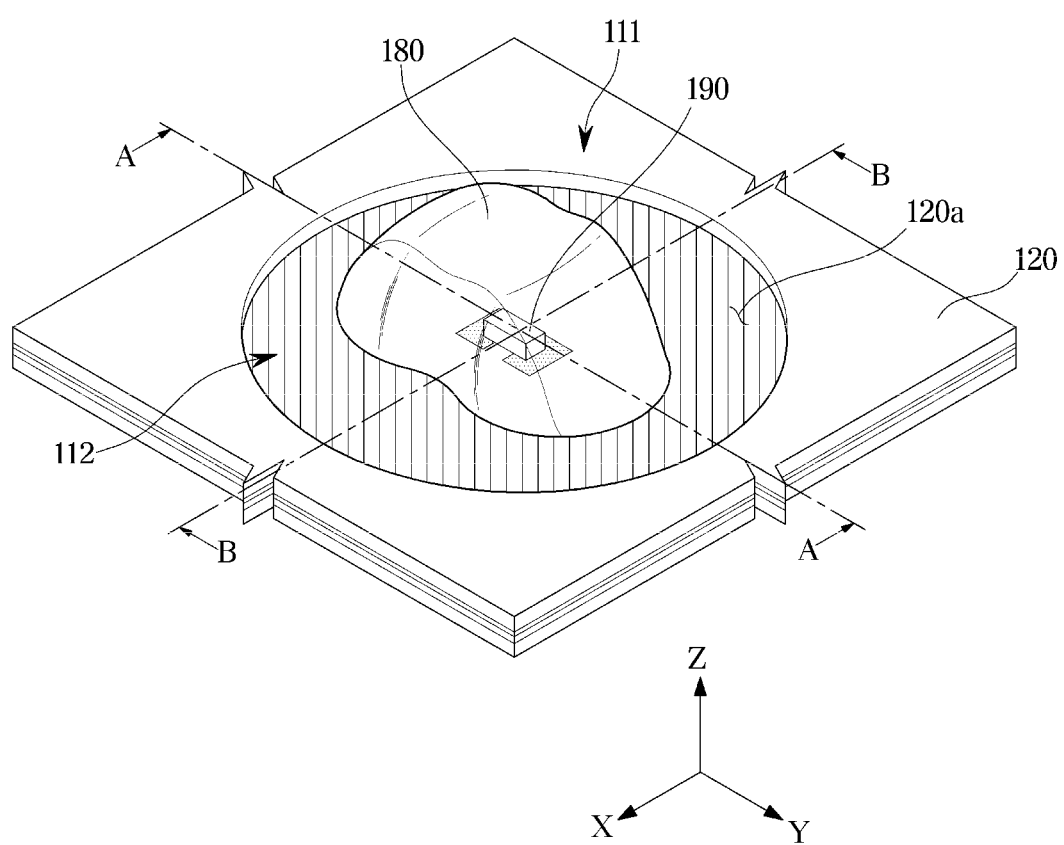
FIG. 5 is a diagram of a light source included in a backlight unit, according to an embodiment of the disclosure.

FIG. 4 is a diagram of a BLU included in a display apparatus, according to an embodiment of the disclosure. FIG. 5 is a diagram of a light source included in a BLU, according to an embodiment of the disclosure;

Referring to FIG. 4, the BLU 100 may include a light source module 110 for generating light, a reflection sheet 120 for reflecting light, a diffuser plate 130 for uniformly diffusing light, and an optical sheet 140 for enhancing brightness of output light.

The light source module 110 may include a plurality of light sources 111 for emitting light, and a substrate 112 for supporting/fixing the plurality of light sources 111.

The plurality of light sources 111 may be arranged in a predefined pattern to emit light with uniform brightness. The plurality of light sources 111 may be arranged such that a light source is equidistant from its neighboring light sources. The plurality of light sources 111 may be arranged such that a distance between one light source and light sources adjacent thereto is the same.

For example, as shown in FIG. 4, the plurality of light sources 111 may be arranged in rows and columns. Accordingly, the plurality of light sources may be arranged such that neighboring four light sources form almost a rectangle. Furthermore, a light source is located to be adjacent to four other light sources, and the distances between the light source and the four neighboring light sources may be almost the same.

Alternatively, the plurality of light sources may be arranged such that neighboring three light sources form almost a triangle. In this case, a light source may be arranged to be adjacent to six other light sources. The distances between the light source and the six neighboring light sources are almost the same.

The arrangement of the plurality of light sources 111 is not, however, limited thereto, and the plurality of light sources 111 may be arranged in various ways to emit light in even brightness.

The light sources 111 may employ a device capable of emitting monochromatic light (light having a wavelength in a particular range or light having a peak wavelength, e.g., blue light) or white light (light having a plurality of peak wavelengths, e.g., a mixture of red light, green light, and blue light) to various directions when powered.

Referring to FIG. 5, each of the plurality of light sources 111 may include an LED 190 and a refractive cover 180.

The thinner the display apparatus 10, the thinner the BLU 100. To make the BLU 100 thinner, each of the plurality of light sources 111 gets thinner and the structure becomes simpler.

The LED 190 may be attached directly to the substrate 112 in a method of chip on board (COB). For example, the light source 111 may include the LED 190 with an LED chip or an LED die attached directly to the substrate 112 without extra packaging.

The LED 190 may be manufactured in a flip chip type. The LED 190 of the flip chip type may not use an intermediate medium such as a metal lead (wire) or a ball grid array (BGA) to attach the LED, which is a semiconductor device, to the substrate 112, but may fuse an electrode pattern of the semiconductor device onto the substrate 112 as it is. This may make it possible for the light source 111 including the LED 190 of the flip chip type to become smaller by omitting the metal lead (wire) or the ball grid array.

Although the LED 190 is described above as having a flip chip type directly fused onto the substrate 112 in the COB method, the light source 111 is not limited to the flip chip type LED. For example, the light source 111 may include a package type of LED.

The refractive cover 180 may cover the LED 190. The refractive cover 180 may prevent or suppress damage to the LED 190 due to an external mechanical action and/or chemical action.

In an embodiment of the disclosure, the refractive cover 180 may be provided in almost a dome shape with a concave center portion. The shape of the refractive cover 180 will be described in detail later.

The refractive cover 180 may be formed of silicon or epoxy resin. For example, melted silicon or epoxy resin is discharged onto the LED 190 through e.g., a nozzle, and then hardened to form the refractive cover 180.

Specifically, the refractive cover 180 may be formed by dispensing and hardening a transparent material in a liquid state at a plurality of points separated from each other. The refractive cover 180 may be formed by hardening after dispensing without an extra process. In other words, the refractive cover 180 may be self-formed.

The refractive cover 180 may be optically transparent or translucent. Light emitted from the LED 190 may pass through the refractive cover 180 to the outside.

In this case, the dome-shaped refractive cover 180 may refract the light like a lens. For example, the light emitted from the LED 190 may be refracted and diffused by the refractive cover 180.

As such, the refractive cover 180 may not only protect the LED 190 from an external mechanical action and/or chemical action or electrical action, but also diffuse the light emitted from the LED 190.

Referring to FIG. 5, the refractive cover 180 may be provided in a rotationally asymmetric shape. In an embodiment, the refractive cover 180 may be formed in the rotationally asymmetric shape such that a diffusion ratio in a first direction of light emitted from the LED 190 is different from a diffusion ratio in a second direction of light emitted from the LED 190, and the second direction is perpendicular to the first direction.

Light diffusion by the refractive cover 180 will be described in detail later.

The substrate 112 may fix the plurality of light sources 111 to prevent the light sources 111 from being moved. In addition, the substrate 112 may supply power to each of the light sources 111 so that the light source 111 may emit light.

The substrate 112 may secure the plurality of light sources 111. The substrate 112 may be formed of a synthetic resin, tapered glass or a PCB with conductive power supply lines formed therein to supply power to the light sources 111.

In this case, as a plurality of LEDs may be provided and may form an array on the top surface of the substrate 112, and a plurality of refractive covers may be provided to correspond to respective LEDs of the plurality of LEDs (i.e., according to some embodiments, the display apparatus 10 may include a plurality of LEDs and a respective plurality of refractive covers, where the plurality of LEDs includes at least the LED 190, and the plurality of refractive covers includes at least the refractive cover 180).

Unlike what is shown in FIG. 4, in an embodiment of the disclosure, the substrate 112 may extend in one direction to be shaped like a bar. The plurality of LEDs may form an array by being arranged to be spaced apart from each other in a direction in which the substrate 112 extends.

The bar-shaped substrate 112 may include a plurality of bar-shape substrates, and may be arranged to be spaced apart in a direction perpendicular to the direction in which the substrate 112 extends.

In this case, a first distance between the neighboring LEDs on the substrate 112 may be different from a second distance between the neighboring substrates 112. In other words, a distance between one substrate 112 and another substrate 112 may be different from a distance between one LED and another LED on the substrate 112. In this case, a direction in which one substrate 112 is spaced apart from another substrate 112 may be perpendicular to a direction in which one LED is spaced apart from another LED on the substrate 112.

Each substrate 112 extends in a first direction, and the plurality of LEDs may be arranged at a first interval in the first direction in which the substrate 112 extends. The plurality of substrates 112 may be arranged at a second interval in a second direction perpendicular to the first direction. Accordingly, the plurality of LEDs may be arranged at the first interval in the first direction and at the second interval in the second direction.

For example, the first direction may refer to a horizontal direction and the second direction may refer to a vertical direction. In this case, the plurality of LEDs may be arranged at the first interval in the horizontal direction and at the second interval in the vertical direction.

With the arrangement, the first interval between the plurality of LEDs in the horizontal direction and the second interval in the vertical direction may be different from each other. In this case, enhancement is needed to make a light emission distribution in the horizontal direction differ from a light emission distribution in the vertical direction of the LED 190. In an embodiment of the disclosure, an optical profile of the LED 190 may be enhanced with the refractive cover 180, which will be described later, covering the LED 190. Specifically, an optical profile in the horizontal direction and an optical profile in the vertical direction of the light emitted from the LED 190 may be different from each other. This will be described in more detail later.

The reflection sheet 120 may reflect light emitted from the plurality of light sources 111 to a forward direction or to a nearly forward direction.

A plurality of through holes 120a are formed on the reflection sheet 120 at positions respectively matching the plurality of light sources 111 of the light source module 110. Furthermore, the light sources 111 of the light source module 110 may pass the through holes 120a and protrude forward from the reflection sheet 120. Accordingly, the plurality of light sources 111 may emit light from the front of the reflection sheet 120. The reflection sheet 120 may reflect the light emitted toward the reflection sheet 120 from the plurality of light sources 111 toward the diffuser plate 130.

The diffuser plate 130 may be arranged in front of the light source module 110 and the reflection sheet 120. The diffuser plate 130 is able to uniformly diffuse the light emitted from the light sources 111 of the light source module 110.

To reduce the non-uniformity in brightness due to the plurality of light sources 111, the diffuser plate 130 may diffuse the light emitted from the plurality of light sources 111 within the diffuser plate 130. In other words, the diffuser plate 130 may diffuse non-uniform light emitted from the plurality of light sources 111, thereby relatively uniformly emitting the light forward.

The optical sheet 140 may include various sheets to improve brightness and uniformity in brightness. For example, the optical sheet 140 may include a light conversion sheet 141, a diffuser sheet 142, a prism sheet 143, and a reflective polarizer sheet 144, etc.

The optical sheet 140 is not limited to the sheets or films as illustrated in FIG. 4, and may further include other various sheets or films such as protective sheets.

Figure 6:
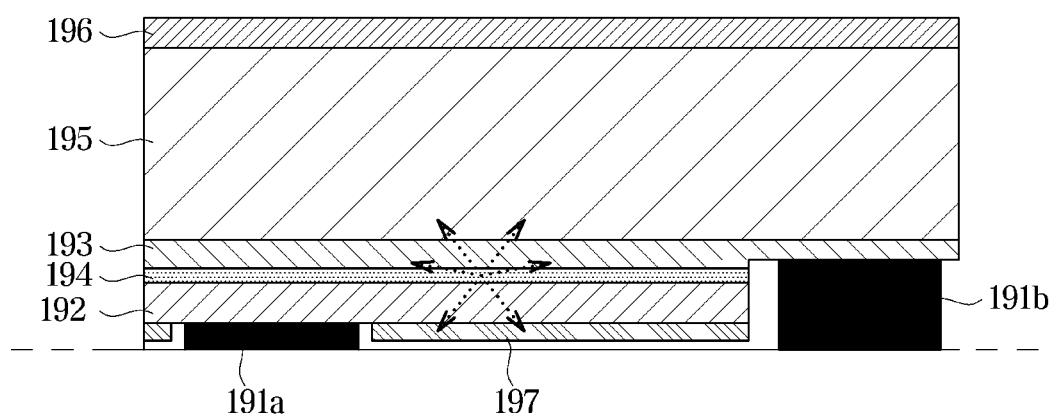
FIG. 6 is a diagram of a light emitting diode (LED) included in a backlight unit, according to an embodiment of the disclosure.
Figure 7:
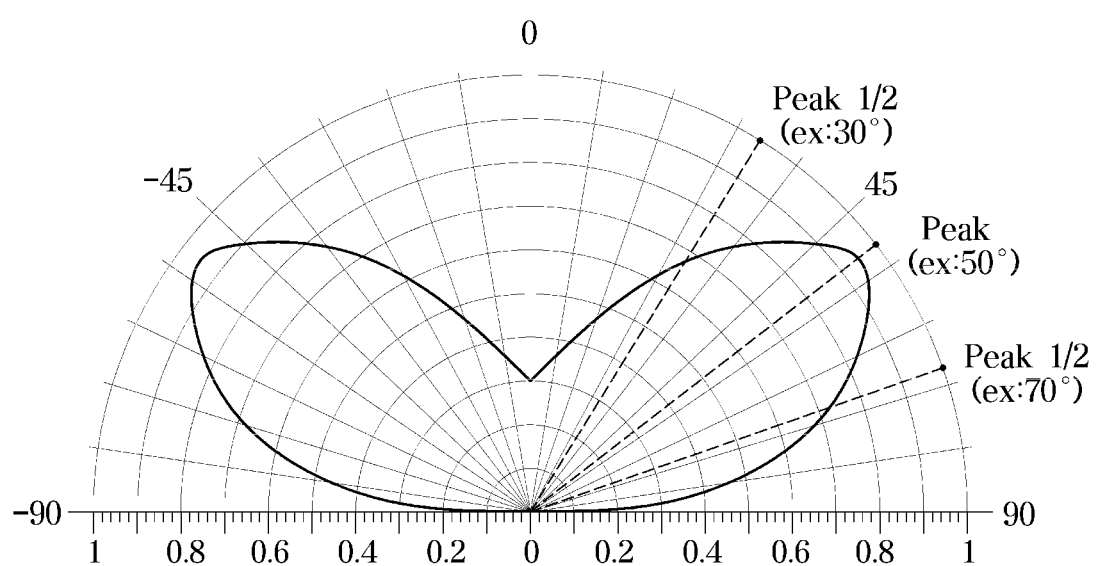
FIG. 7 is a diagram of intensities of light emitted from the LED shown in FIG. 6 depending on exit angles, according to an embodiment of the disclosure.

FIG. 6 is a diagram of an LED included in a backlight unit, according to an embodiment of the disclosure. FIG. 7 is a diagram of intensities of light emitted from the LED shown in FIG. 6 depending on exit angles according to an embodiment of the disclosure.

Referring to FIG. 6, the LED 190 may include a transparent substrate 195, an n-type semiconductor layer 193, and a p-type semiconductor layer 192. A multi quantum wells (MQW) layer 194 is formed between the n-type semiconductor layer 193 and the p-type semiconductor layer 192.

The transparent substrate 195 may be a base of p-n junction which may emit light. The transparent substrate 195 may contain, for example, sapphire $Al_2O_3$ having a similar crystal structure to the semiconductor layers 192 and 193.

The p-n junction may be formed by joining the n-type semiconductor layer 193 and the p-type semiconductor layer 192. A depletion region may be created between the n-type semiconductor layer 193 and the p-type semiconductor layer 192. Electrons of the n-type semiconductor layer 193 and holes of the p-type semiconductor layer 192 may be recombined in the depletion region. Light may be emitted due to the recombining of electrons and holes.

The n-type semiconductor layer 193 may include, for example, n-type gallium nitride GaN. The p-type semiconductor layer 192 may include, for example, p-type gallium nitride GaN. Energy band gap of gallium nitride GaN is 3.4 electronvolt (eV) at which to emit light having a wavelength shorter than about 400 nm. Hence, from the junction between the n-type semiconductor layer 193 and the p-type semiconductor layer 192, (deep) blue light or ultraviolet (UV) rays may be emitted.

The n-type semiconductor layer 193 and the p-type semiconductor layer 192 are not limited to gallium nitride GaN, and other various semiconductor materials may be used for rays required.

A first electrode 191a of the LED 190 electrically contacts the p-type semiconductor layer 192, and a second electrode 191b electrically contacts the n-type semiconductor layer 193. The first electrode 191a and the second electrode 191b may serve not only as electrodes but also as reflectors that reflect light.

When a voltage is applied to the LED 190, holes may be supplied to the p-type semiconductor layer 192 through the first electrode 191a and electrons may be supplied to the n-type semiconductor layer 193 through the second electrode 191b. Electrons and holes may be recombined in the depletion region formed between the p-type semiconductor layer 192 and the n-type semiconductor layer 193. During the recombining of electrons and holes, energy (e.g., kinetic energy and potential energy) of the electrons and the holes may be converted to light energy. In other words, when electrons and holes are recombined, light may be emitted.

In this case, the energy gap of the MQW layer 194 is smaller than the energy gap of the p-type semiconductor layer 192 and/or the n-type semiconductor layer 193. Hence, the holes and electrons may be captured in the MQW layer 194.

The holes and electrons captured in the MQW layer 194 may be easily recombined in the MQW layer 194. This may increase light emitting efficiency of the LED 190.

From the MQW layer 194, light having a wavelength corresponding to the energy gap of the MQW layer 194 may be emitted. For example, from the MQW layer 194, blue light of 420 nm to 480 nm may be emitted. As such, the MQW layer 194 may correspond to a light emission layer for emitting blue light.

The light produced by recombination of the electron and the hole may be emitted not in a particular direction but in all directions, as shown in FIG. 6. As for the light emitted from a plane like the MQW layer 194, the light generally has the highest intensity when emitted in a perpendicular direction from the emitting plane and the lowest intensity when emitted in a direction parallel to the emitting plane.

On the outer side (an upper side in the drawings) of the transparent substrate 195, arranged is the first reflection layer 196. In other words, the first reflection layer 196 may be arranged on the top of the light emission layer 194. On the outer side (a lower side in the drawings) of the p-type semiconductor layer 192, arranged is the second reflection layer 197. In this way, the transparent substrate 195, the n-type semiconductor layer 193, the MQW layer 194, and the p-type semiconductor layer 192 may be arranged between the first reflection layer 196 and the second reflection layer 197.

The first reflection layer 196 and the second reflection layer 197 may each reflect a portion of incident light while passing the other portions of the incident light.

For example, the first reflection layer 196 and the second reflection layer 197 may reflect light having a wavelength in a particular wavelength range while passing light having a wavelength out of the particular wavelength range. Specifically, the first reflection layer 196 and the second reflection layer 197 may reflect the blue light having a wavelength between 420 nm and 480 nm emitted from the MQW layer 194.

Furthermore, the first reflection layer 196 and the second reflection layer 197 may reflect the incident light having a particular incident angle and pass light that deviates from the particular incident angle. As such, the first reflection layer 196 and the second reflection layer 197 may be DBR layers formed by layering materials having different refraction indexes to have different reflectance depending on the incident angle.

For example, the first reflection layer 196 may reflect light entering at a small incident angle and pass light entering at a large incident angle. Furthermore, the second reflection layer 197 may reflect or pass light entering at a small incident angle and reflect light entering at a large incident angle. The incident light may be blue light having a wavelength between 420 nm and 480 nm.

The intensity of light emitted in a direction perpendicular to the top surface of the LED 190 (in the upper direction of the LED 190) may be lower than the intensity of light emitted in a direction slanted to the top surface of the LED 190 (e.g., a direction slanted from the upper direction in the drawing at about 40 to 60 degrees).

In this case, a directivity angle of the light emitted in a direction perpendicular to the top surface of the LED 190 may be defined to be 0 degree, and a directivity angle of light emitted in a direction slanted to the top surface of the LED 190 may be defined to be larger than 0 degree and equal to or less than 90 degrees.

In an embodiment of the disclosure, light emitted at an angle of about 40 to 60 degrees from the vertical axis of the LED 190 may have the highest light intensity. For example, the LED 190 may have a peak light intensity at a point having a directivity angle of 50°. In other words, among the rays exit from the LED 190, a ray having a directivity angle of 50° may have the highest light intensity.

Furthermore, the LED 190 may have half the peak light intensity in a region having lower directivity angles than the directivity angle having the peak light intensity. For example, the LED 190 may have a light intensity (Peak 1/2) corresponding to half the peak light intensity at a point having a directivity angle of 30°.

Furthermore, the LED 190 may have half the peak light intensity in a region having higher directivity angles than the directivity angle having the peak light intensity. For example, the LED 190 may have a light intensity (Peak 1/2) corresponding to half the peak light intensity at a point having a directivity angle of 70°.

As such, the LED 190 may have a roughly bat-wing shaped optical profile. The bat-wing shaped optical profile may represent an optical profile with the intensity of light exiting in a slanted direction (e.g., in a direction at about 40 to 60 degrees from the vertical axis of the emitting plane, e.g., the MQW layer 194) higher than the intensity of light exiting in the vertical direction of the emitting plane of the LED 190.

With the bat-wing shaped optical profile, the number of LEDs 190 to be included in the display apparatus 10 may be reduced.

To improve image quality of the display apparatus 10, it is important for the BLU 100 to emit surface light with uniform brightness. For example, with the reduced number of LEDs, which are point light sources, the difference in brightness between a region where the LED is located and a region where the LED is not located (i.e., a region between the LEDs) may increase. In other words, with the decreasing number of the point light sources, LEDs, uniformity in brightness of the surface light emitted by the BLU 100 may become worse.

In this case, with the use of the LEDs 190 having the bat-wing shaped optical profile, the difference in brightness between the region where the LED is located and the region between the LEDs may decrease. This may reduce the number of LEDs 190.

Further, the thinner the thickness of the display apparatus 10, the shorter the optical distance (OD) that allows the light emitted from the point light sources, the LEDs, to be diffused into the surface light. Hence, the uniformity in brightness of the surface light emitted by the BLU 100 may become worse. To maintain uniformity in brightness, the number of LEDs may increase.

In this case, with the use of the LED 190 having the bat-wing shaped optical profile, the increase in the number of LEDs 190 may be minimized.

As such, the LED 190 having the bat-wing shaped optical profile may improve uniformity in brightness of the BLU 100. Accordingly, the number of LEDs 190 may be reduced while maintaining the uniformity in brightness of the BLU 100.

However, even with the LED 190 having the bat-wing shaped optical profile, the optical distance may get short, and with the reduced number of LEDs 190, uniformity in brightness of the BLU 100 may get worse. Accordingly, this needs to be improved.

Figure 8:
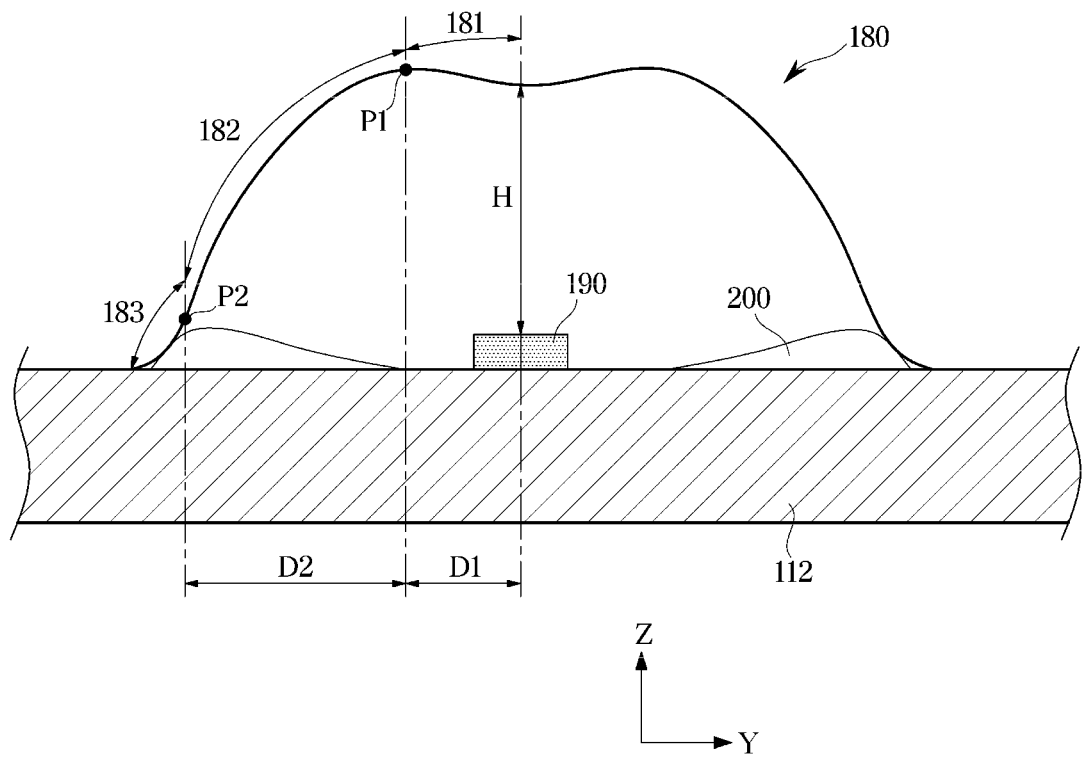
FIG. 8 is a diagram of a cross-section along A-A of FIG. 6, according to an embodiment of the disclosure.
Figure 9:
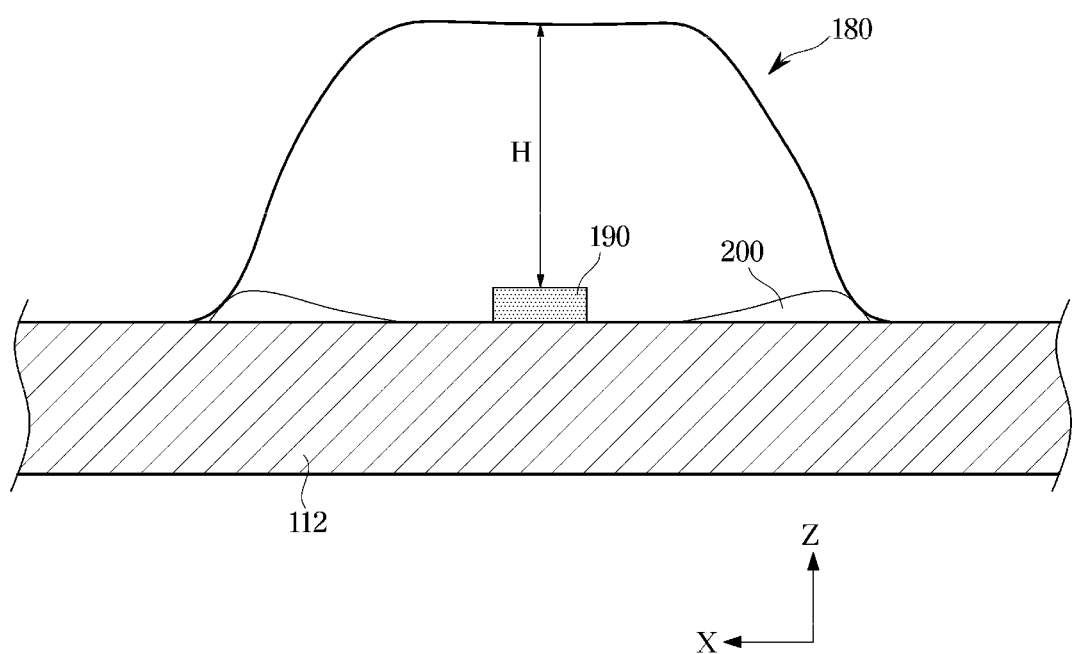
FIG. 9 is a diagram of a cross-section along B-B of FIG. 6, according to an embodiment of the disclosure.

FIG. 8 is a diagram of a cross-section along A-A of FIG. 6, according to an embodiment of the disclosure. FIG. 9 is a diagram of a cross-section along B-B of FIG. 6, according to an embodiment of the disclosure.

Referring to FIGS. 8 and 9, in an embodiment of the disclosure, the light source 111 may include the LED 190 that emits light, and the refractive cover 180 for covering the LED 190 and refracting light emitted from the LED 190.

The refractive cover 180 encloses the LED 190 to be centered at the LED 190 and is filled with a transparent material having a refractive index higher than air to refract the light emitted from the LED 190. The refractive cover 180 may enclose the LED 190 such that all but the bottom side of the LED 190 (i.e., the top and all the four sides of the LED 190) are covered. The transparent material that forms the refractive cover 180 may be, for example, silicon or epoxy resin, and has no limitations.

The refractive cover 180 may protect the LED 190 against external mechanical and/or chemical actions or electric actions by covering the LED 190. Furthermore, the refractive cover 180 may refract the light emitted from the LED 190 so that the light passing the refractive cover 180 may enter the liquid crystal panel 20 more uniformly. This may increase light extraction efficiency and light diffusion performance of the LED 190, and make the BLU 100 become thinner because lighting uniformity may be secured without mura even at a short optical distance.

The refractive cover 180 may have a shape that allows light intensity distributions of the LED 190 having the bat-wing shaped optical profile to be optimally controlled for each angle component or each region.

In an embodiment of the disclosure, the refractive cover 180 may be rotationally asymmetrical with respect to the central axis of the LED 190. As shown in FIGS. 8 and 9, a cross-sectional shape of the refractive cover 180 in a first plane perpendicular to the X-axis may be different from a cross-sectional shape of the refractive cover 180 in a second plane perpendicular to the Y-axis.

Referring to FIG. 8, the cross-sectional shape in the first plane of the refractive cover 180 may include a first refractive surface 181, a second refractive surface 182, and a third refractive surface 183.

The first refractive surface 181 may include a point at a certain height H up from the center of the LED 190. In an embodiment of the disclosure, the first refractive surface 181 may be provided to have increasing height in a direction away from the point in the horizontal direction from the central axis of the LED 190. In other words, the first refractive surface 181 may be formed as a curved surface in a concave shape with the lowest height at the point having the height H up from the center of the LED 190. The first refractive surface 181 may be formed to have height from the substrate 112, which increases at a certain rate from the point to a first inflection point P1.

The second refractive surface 182 may be provided to have decreasing height in a direction away from the first inflection point P1, which is an end of the first refractive surface 181, in the horizontal direction from the central axis of the LED 190. The second refractive surface 182 may be curved in a convex shape having an inflection point at around the middle of the second refractive surface 182.

The second refractive surface 182 may be a curved surface having increasing acute angles toward the central axis of the LED 190, the acute angle formed between a tangent to the second refractive surface 182 and the central axis of the LED 190.

The third refractive surface 183 may be connected to the top surface of the substrate 112 from a second inflection point P2, which is an end of the second refractive surface 182. The third refractive surface 183 may have a concavely curved shape due to surface tension.

For example, when an acute angle formed between a tangent at a first point of the second refractive surface 182 and the central axis of the LED 190 is a first angle, a second angle, which is an acute angle formed between a tangent at a second point nearer to the central axis of the LED 190 than the first point is and the central axis of the LED 190, may be larger than the first angle. In other words, the second refractive surface 182 may be formed to have height from the substrate 112, which increases at a certain rate from the second inflection point P2 to the first inflection point P1.

In an embodiment of the disclosure, a distance in the horizontal direction between the point on the first refractive surface 181 spaced apart up from the center of the LED 190 and the first inflection point P1 may be D1, and a horizontal distance between the first inflection point P1 and the second inflection point P2 may be D2. The refractive cover 180 may be formed such that D2 is larger than D1.

In an embodiment of the disclosure, a reflector 200 may be arranged on an inner side of the refractive cover 180. The reflector 200 may convert a ray having a large directivity angle among rays emitted from the LED 190 to an effective ray. In other words, the reflector 200 may convert background rays of the LED 190 to the effective rays by reflecting the background rays forward. The background rays may refer to rays having directivity angles near about 90 degrees.

Figure 10:
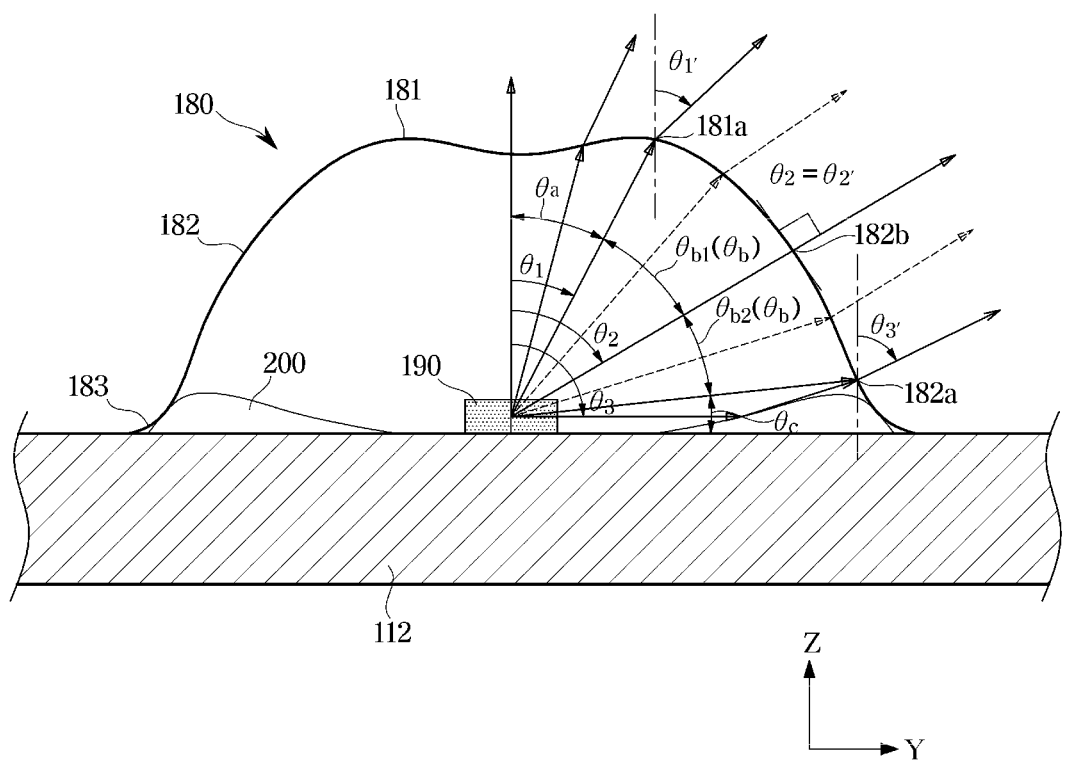
FIG. 10 is a diagram of a refractive cover refracting light emitted from an LED, according to an embodiment of the disclosure.

FIG. 10 is a diagram of a refractive cover refracting light emitted from an LED, according to an embodiment of the disclosure. FIG. 11 is a table for describing changes in exit angle with the increase in directivity angle resulting from a refractive cover refracting light emitted from an LED, according to an embodiment of the disclosure.

Referring to FIG. 10, light emitted from the LED 190 according to an embodiment of the disclosure may have directivity angles between −90° to +90° from the vertical axis of the top surface of the LED 190. The following embodiments of the disclosure will be focused on rays having directivity angles of 0° to +90°, which may, however, equally applied to symmetrical rays of 0° to −90°.

A ray having the directivity angle of 0° (i.e., a ray emitted vertically from the top surface of the LED 190) may be released to the outside of the refractive cover 180 through a point of the first refractive surface 181. In this case, the ray passing through the first refractive surface 181 at the point may not be refracted. In other words, the ray having the directivity angle of 0° may have the incidence angle and the exit angle (refraction angle), which are equally 0°.

A ray emitted from the LED 190 toward the first refractive surface 181 may have the exit angle proportionally increasing with the increase in directivity angle θa. For example, a ray having a directivity angle of θ1 may enter a boundary area 181a between the first refractive surface 181 and the second refractive surface 182, and exit angle θ1' may be larger than the directivity angle θ1. In this case, the exit angle θ1' may be the largest among exit angles of rays passing through the first refractive surface 181.

Furthermore, in some embodiments of the disclosure, the boundary area 181a between the first refractive surface 181 and the second refractive surface 182 may be designed such that light having a light intensity corresponding to half the peak light intensity (e.g., at directivity angle 30°) may pass through the first refractive surface 181. In other words, the first refractive surface 181 may include a region through which, among rays emitted from the LED 190, a ray having half the maximum light intensity and slanted at an angle smaller than the directivity angle of a ray having the peak light intensity passes.

A ray having directivity angle θb may enter the second refractive surface 182 and be released to the outside of the refractive cover 180. The second refractive surface 182 may include a non-refractive point 182b at which incident angle θ2 and exit angle θ2' are the same.

A ray having incident angle θb1 may enter between the boundary area 181a between the first refractive surface 181 and the second refractive surface 182 and the non-refractive point 182b. The exit angle of the ray having the incident angle θb1 may be larger than the incident angle.

On the second refractive surface 182, rays entering from an end of the first refractive surface (e.g., the boundary area 181a) to the non-refractive point 182b may have decreasing increments of the exit angle with an increase in directivity angle. As described above, the incident angle and the exit angle may be the same at the non-refractive point 182b.

A ray having incident angle θb2 may enter between the non-refractive point 182b and an end 182a of the second refractive surface 182. The exit angle of the ray having the incident angle θb2 may be larger than the incident angle.

On the second refractive surface 182, rays entering from the non-refractive point 182b to the end 182a of the second refractive surface 182 may have an exit angle proportionally increasing with the increase in directivity angle. The exit angle of the ray entering the end 182a of the second refractive surface 182 at incident angle θ3 may be θ3' larger than the incident angle θ3. On the second refractive surface 182, rays entering from the non-refractive point 182b to the end 182a of the second refractive surface 182 may have a maximum exit angle at the point 182a on the second refractive surface 182.

The second refractive surface 182 may include a region through which a ray with the highest light intensity among rays emitted from the LED 190 passes. That is, a ray having the peak light intensity may pass through the second refractive surface 182. For example, when the LED 190 has the optical profile as in FIG. 7, a ray having a directivity angle of 50° may pass through the second refractive surface 182. Depending on the curvature of the second refractive surface 182, a point at which the ray having the peak light intensity passes through may be the same point at which the incident angle θ2 and the exit angle θ2' are the same.

A ray having a directivity angle of θc may enter the third refractive surface 183. The third refractive surface 183 may be formed in a concave shape due to surface tension of the substrate 112. When the third refractive surface 183 has this shape, a ray entering the third refractive surface 183 with a high directivity angle may not be refracted forward to the liquid crystal panel 20 but may be refracted rearward or released sideways. This may reduce light extraction efficiency of the LED 190.

In an embodiment of the disclosure, a reflector 200 may be arranged on the substrate 112 to reduce the directivity angle of a ray entering the third refractive surface 183. The reflector 200 may be formed along edges of the refractive cover 180, and may have the form of an oval band when viewed from above the substrate 112. The reflector 200 may be formed to have an inclined plane that is slanted upward in a horizontal direction away from the LED 190.

The ray having a directivity angle of θc may not enter directly to the third refractive surface 183. The ray having the directivity angle of θc may be reflected from the reflector 200. The ray having the directivity angle of θc may enter the third refractive surface 183 or the second refractive surface 182 at a lower directivity angle than θc by means of the reflector 200. The ray reflected by the reflector 200 and entering the second refractive surface 182 or the third refractive surface 183 may be refracted forward to the liquid crystal panel 20. Accordingly, the ray having the directivity angle of θc may be converted to an effective ray and the light extraction efficiency of the LED 190 may be improved.

In the table as shown in FIG. 11, changes in exit angle with the increase in directivity angle entering the first refractive surface 181, the second refractive surface 182 and the third refractive surface 183 are summarized. In the meantime, a ray emitted from the LED 190 at a high directivity angle may be reflected by the reflector 200 and may not enter the third refractive surface 183. In other words, a ray emitted from the LED 190 may not enter the third refractive surface 183 depending on the shape of the refractive cover 180 and the reflector 200. In this case, a ray emitted from the LED 190 at directivity angle θc may be refracted by the reflector 200 and may not enter the second refractive surface 182.

Without the refractive cover 180, the optical profile of the light source 111 may have the peak light intensity located at a distance from the central axis of the LED 190, causing a blind spot at around the center of the LED 190 and making relatively narrow full width at half maximum.

On the contrary, with the refractive cover 180, the optical profile of the light source 111 may have a shape in which the light intensity gradually decreases the farther the distance from the center of the LED 190, which dissolves the blind spot at around the center of the LED 190 and increases the full width at half (e.g., by 130%) thereby increasing uniformity in brightness.

Figure 12:
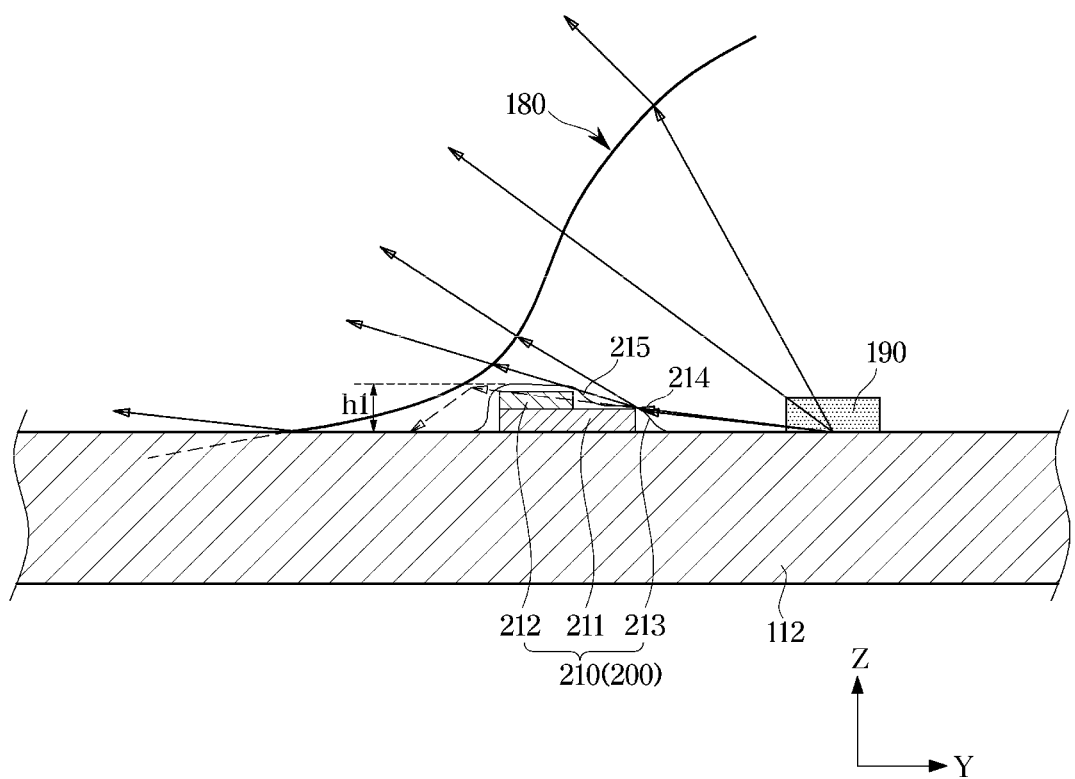
FIG. 12 is a diagram of a reflector, according to an embodiment of the disclosure.
Figure 13:
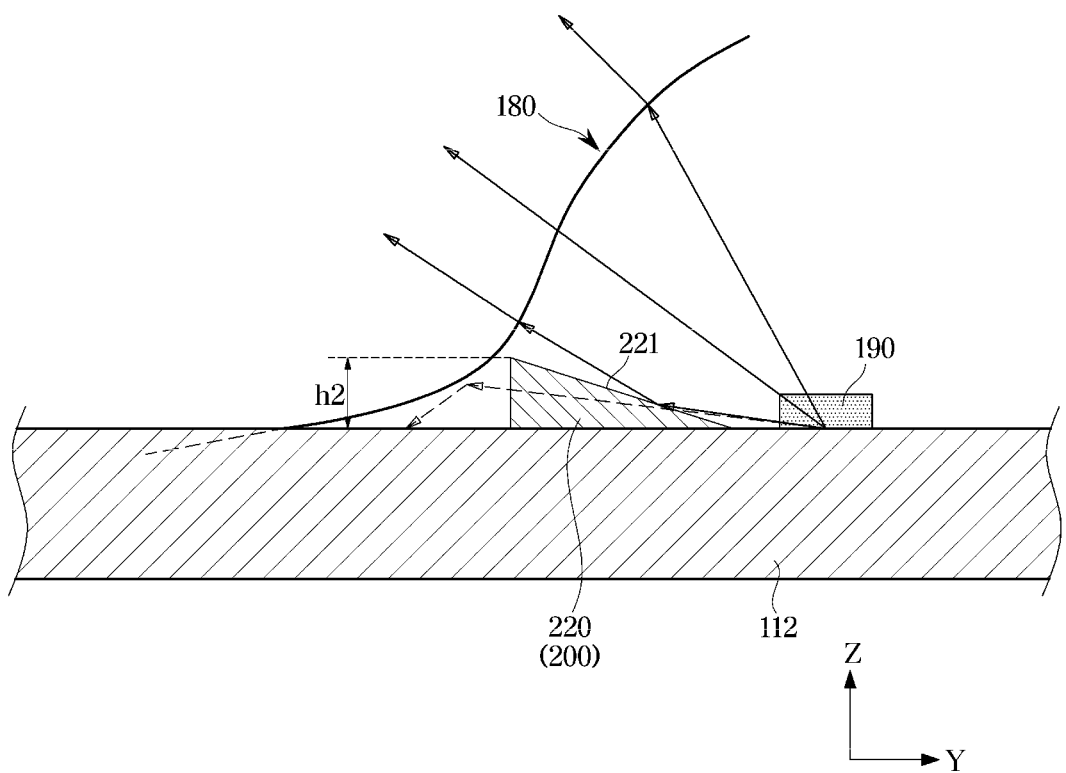
FIG. 13 is a diagram of a reflector, according to an embodiment of the disclosure.
Figure 14:
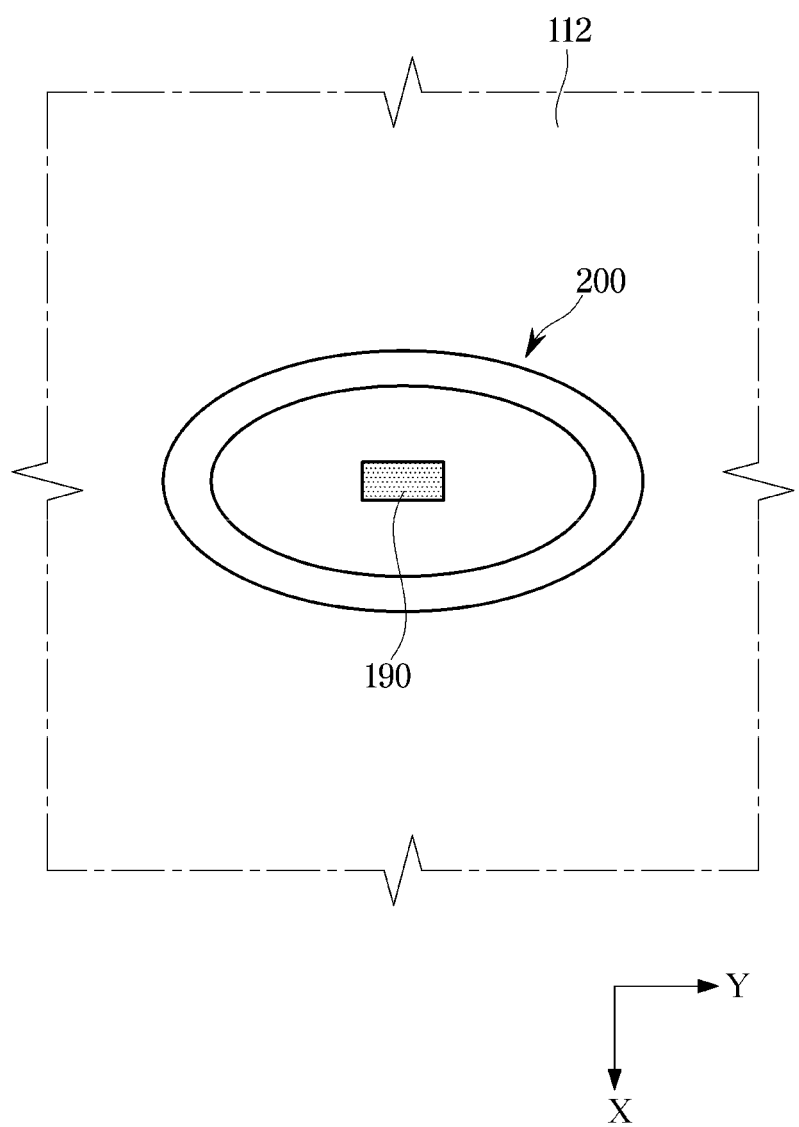
FIG. 14 is a diagram of a substrate, an LED mounted on the substrate, and a reflector, according to an embodiment of the disclosure.

FIG. 12 is a diagram of a reflector, according to an embodiment of the disclosure. FIG. 13 is a diagram of a reflector, according to an embodiment of the disclosure. FIG. 14 is a diagram of a substrate, an LED mounted on the substrate, and a reflector, according to an embodiment of the disclosure.

Referring to FIGS. 12 to 14, the reflector 200 in accordance with an embodiment of the disclosure will now be described.

Referring to FIG. 12, the reflector 200 according to an embodiment of the disclosure may include a reflector 210.

The reflector 210 may be formed by creating a plurality of reflection patterns on the substrate 112. For example, the reflector 210 may include a first reflection pattern 211 and a second reflection pattern 212. The first reflection pattern 211 may be formed by coating the substrate 112 with a photo solder resist (PSR) having high reflectance. The second reflection pattern 212 may be formed by coating the first reflection pattern 211 with the PSR having high reflectance. In this case, the second reflection pattern 212 may be formed to have a smaller area than the first reflection pattern 211. This may make the top surfaces of the first and second reflection patterns 211 and 212 located at different levels.

The reflector 210 may include a reflective cover 213 covering both the first and second reflection patterns 211 and 212 by applying the PSR onto a whole mounting surface of the substrate 112.

With this structure, the reflector 210 may include a first inclined plane 214 formed on one side of the first reflection pattern 211 and a second inclined plane 215 formed on one side of the second reflection pattern 212. The one side of the first reflection pattern 211 and the one side of the second reflection pattern 212 may refer to a side of the first reflection pattern 211 and a side of the second reflection pattern 212, respectively, which are close to the LED 190.

The first and second inclined planes 214 and 215 may be formed to be slanted upward in the horizontal direction away from the LED 190. Accordingly, incident rays onto the first and second inclined planes 214 and 215 may be reflected to be rays having lower directivity angles. This may increase light extraction efficiency of the LED 190. In other words, background rays emitted from the LED 190 may be converted to effective rays.

As shown in FIG. 12, the reflector 210 may include three or more reflection patterns and reflective covers covering the reflection patterns.

In an embodiment of the disclosure, a maximum height h1 of the reflector 210 may be a tenth of the height H (see FIG. 8) of the refractive cover 180 at the central axis of the LED 190. In other words, h1 may be 0.1H or less. This may be expressed as follows: h1≥H.

Referring to FIG. 13, the reflector 200 according to an embodiment of the disclosure may include a reflector 220.

The reflector 220 may be formed of a material having high reflectance. The reflector 220 may be formed in various methods. For example, the reflector 220 may be injection-molded. The reflector 220 separately formed by injection molding may be bonded onto the substrate 112. After the reflector 220 is bonded onto the substrate 112, as will be described later, the refractive cover 180 covering the LED 190 and the reflector 220 may be formed by dispensing a transparent material at a plurality of points.

The reflector 220 may include an inclined plane 221 formed to be slanted upward in horizontal direction away from the LED 190. Incident rays toward the reflector 220 may be reflected forward from the inclined plane. This may increase light extraction efficiency of the LED 190, as described above. In other words, background rays emitted from the LED 190 may be converted to effective rays.

In an embodiment of the disclosure, a maximum height h2 of the reflector 220 may be a tenth of the height H (see FIG. 8) of the refractive cover 180 at the central axis of the LED 190. In other words, h2 may be 0.1H or less. This may be expressed as follows: h2≥H.

Referring to FIG. 14, the reflector 200 according to an embodiment of the disclosure may form a closed loop along the edges of the LED 190. In other words, when the substrate 112 is viewed from above the substrate 112, the reflector 200 may be provided in the shape of almost an oval band. The reflector 200 may be formed along the inner circumference of the refractive cover 180. From a different perspective, the reflector 200 may roughly define the edges of the refractive cover 180. The reflector may serve as a dam to prevent the transparent material in the liquid state from freely spreading on the substrate 112 in the horizontal direction.

Figure 15:
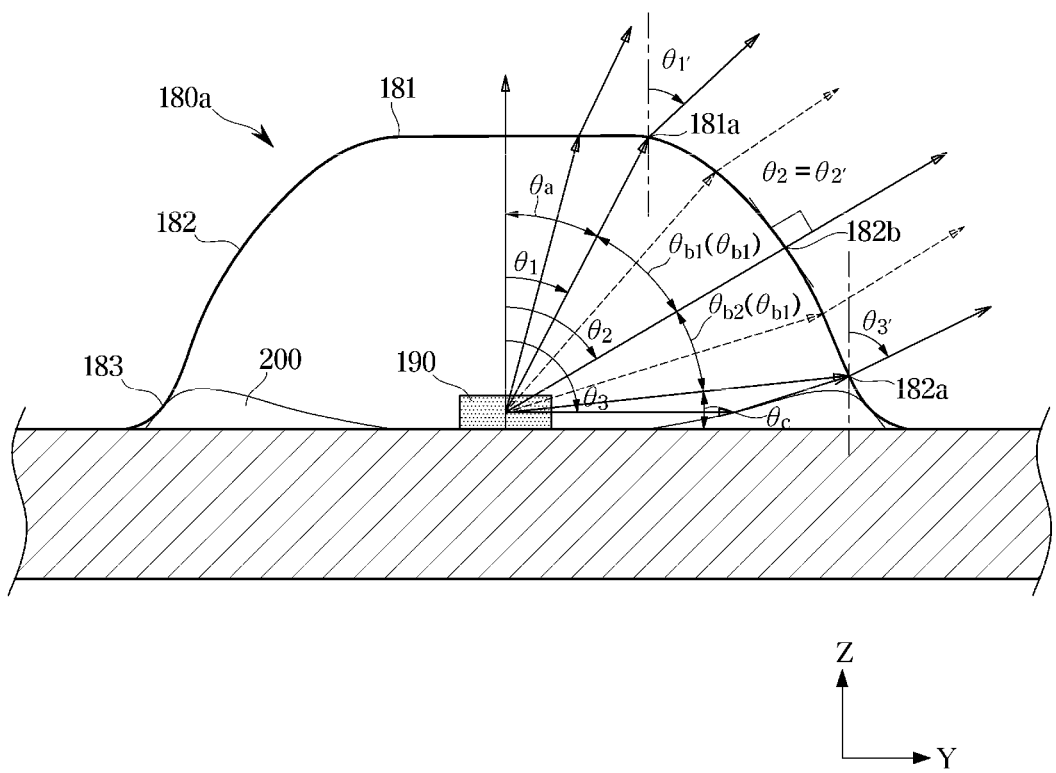
FIG. 15 is a diagram of an occasion when a first refractive surface of a refractive cover is a flat plane, according to an embodiment of the disclosure.

FIG. 15 is a diagram of an occasion when a first refractive surface of a refractive cover is a flat plane, according to an embodiment of the disclosure.

Referring to FIG. 15, the first refractive surface 181 of the refractive cover 180a according to an embodiment of the disclosure may be provided in a flat form. That is, the first refractive surface 181 may be provided as a flat plane.

Figure 16:
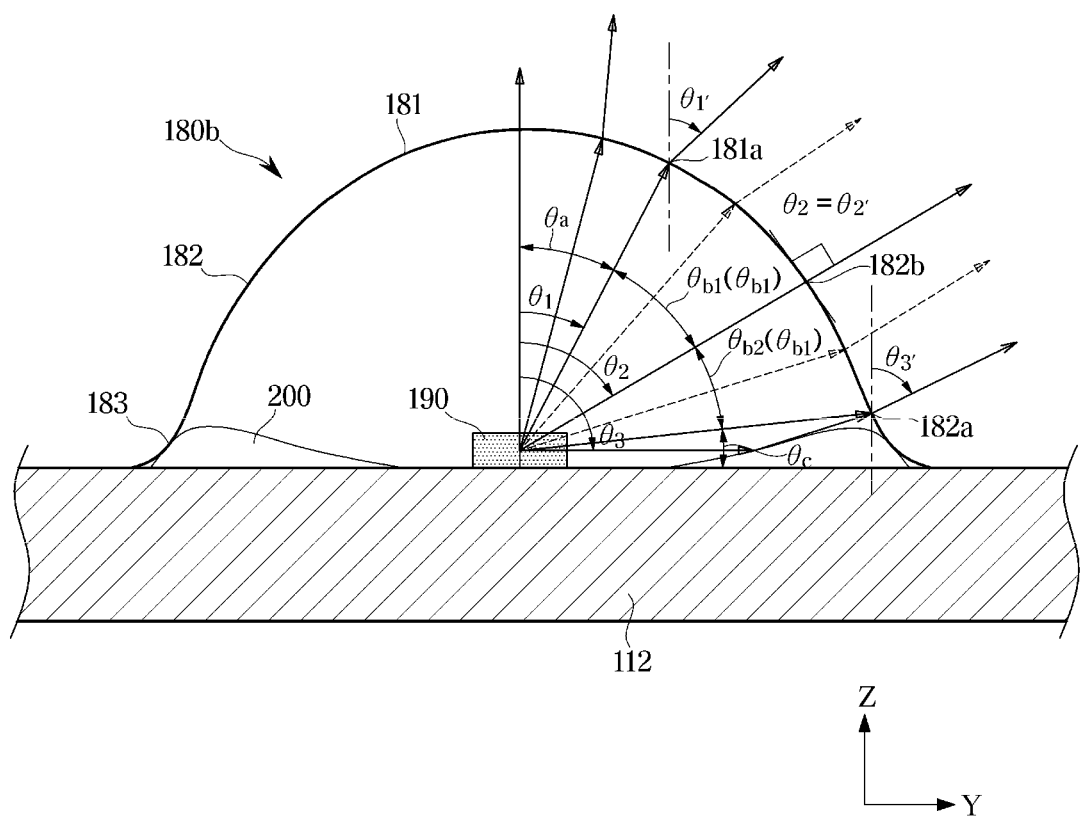
FIG. 16 is a diagram of an occasion when a first refractive surface of a refractive cover has a convex shape, according to an embodiment of the disclosure.

FIG. 16 is a diagram of an occasion when a first refractive surface of a refractive cover has a convex shape, according to an embodiment of the disclosure.

Referring to FIG. 16, the first refractive surface 181 of the refractive cover 180b according to an embodiment of the disclosure may be provided in a convex shape. In this case, the first refractive surface 181 may have a largest distance to the substrate 112 or the LED 190 at the center.

An embodiment of a method of manufacturing the display apparatus 10 will now be described. The display apparatus 10 according to the aforementioned embodiments may be manufactured according to the method of manufacturing the display apparatus 10. Hence, what are described above with reference to FIGS. 1 to 16 may be equally applied in the following method of manufacturing the display apparatus 10.

Figure 17:
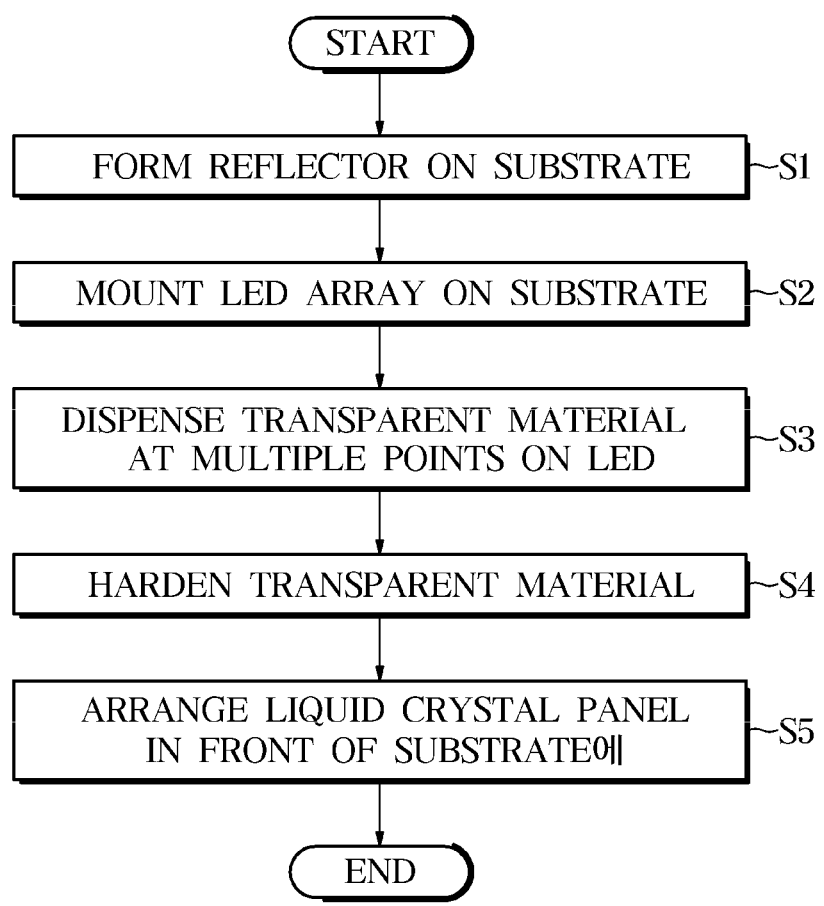
FIG. 17 is a flowchart of a method of manufacturing a display apparatus, according to an embodiment of the disclosure.
Figure 18:
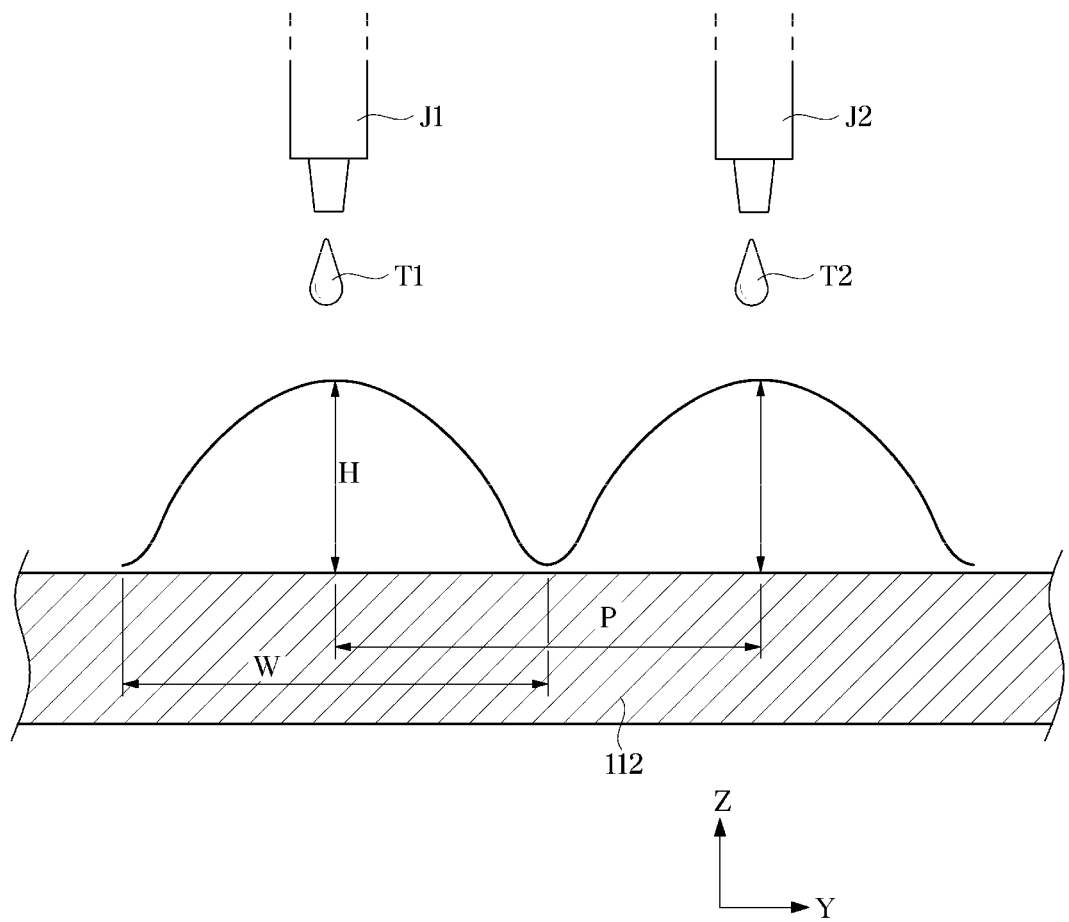
FIG. 18 is a diagram of a case of dispensing a transparent material at two points separated from each other to form a refractive cover, according to an embodiment of the disclosure.

FIG. 17 is a flowchart of a method of manufacturing a display apparatus, according to an embodiment of the disclosure. FIG. 18 is a diagram of a case of dispensing a transparent material at two points separated from each other to form a refractive cover, according to an embodiment of the disclosure.

Referring to FIG. 17, the reflector 200 may be formed on the substrate 112. The reflector 200 may be formed by multi-phased patterning of a PSR on the substrate 112 as described above, and unlike this, by bonding a pre-fabricated structure on the substrate 112, in operation S1.

In other words, the reflector 200 may be formed on the top surface or the mounting surface of the substrate 112 according to an embodiment of the disclosure.

The forming of the reflector 200 on the substrate 112 may include applying the PSR on the entire mounting surface of the substrate 112.

Subsequently, an array of the LEDs 190 may be mounted on the substrate 112, in operation S2.

The mounting of the array of the LEDs 190 on the mounting surface of the substrate 112 may include bonding the LEDs 190 directly onto the substrate 112 in a CoB method. For example, the light source 111 may include the LEDs 190 with an LED chip or an LED die attached directly to the substrate 112 without extra packaging. In this case, the substrate 112 may extend to be long in one direction like a bar shape.

A transparent material may then be dispensed at a plurality of points separated from each other on the LED 190 in operation S3.

The transparent material may be dispensed on the LED 190 in a liquid state. The transparent material may be a material with reflectance higher than air. The transparent material may be, for example, silicon or epoxy resin, and has no limitations.

Referring to FIG. 18, a first dispenser J1 and a second dispenser J2 may dispense transparent materials T1 and T2 each in a liquid state. In this case, the first dispenser J1 and the second dispenser J2 may be arranged at a first distance P from each other in the horizontal direction.

The first transparent material T1 dispensed from the first dispenser J1 may form the shape of a dome with a maximum height H and a maximum width W. Similarly, the second transparent material T2 dispensed from the second dispenser J2 may form the shape of a dome with the maximum height H and the maximum width W.

The shape of the refractive cover 180 formed by the transparent materials T1 and T2 dispensed from the first and second dispensers J1 and J2 may be determined according to the distance P between the first and second dispensers J1 and J2 when there are the two dispensers. Furthermore, the shape of the refractive cover 180 may be determined according to thixotropic properties of the transparent materials T1 and T2 dispensed from the first and second dispensers J1 and J2. Furthermore, the shape of the refractive cover 180 may be determined according to amounts of the transparent materials T1 and T2 dispensed from the first and second dispensers J1 and J2. In other words, the shape of the refractive cover 180 may be determined by the distance between the dispensers separated from each other, the thixotropic property of the transparent material, and the amount of the transparent material dispensed from the dispenser.

Subsequently, the transparent materials T1 and T2 dispensed from the dispensers J1 and J2 may be hardened in operation S4. In an embodiment of the disclosure, hardening the transparent material may not require an extra process. Accordingly, in an embodiment of the disclosure, the refractive cover 180 may be formed by dispensing and hardening. In other words, the refractive cover 180 may be self-formed.

After the refractive cover 180 is formed through the aforementioned processes, the liquid crystal panel 20 may be arranged in front of the substrate 112 in operation S5, completing manufacturing the display apparatus 10.

As such, according to the embodiment of the disclosure, the refractive cover may be formed in a process of injecting a liquid transparent material using the dispenser instead of an LED package including an expensive aspherical optical lens form, and hardening the liquid transparent material. Accordingly, productivity of the display apparatus may be increased. Furthermore, price competitiveness of the display apparatus may increase by reducing the material cost.

Figure 19:
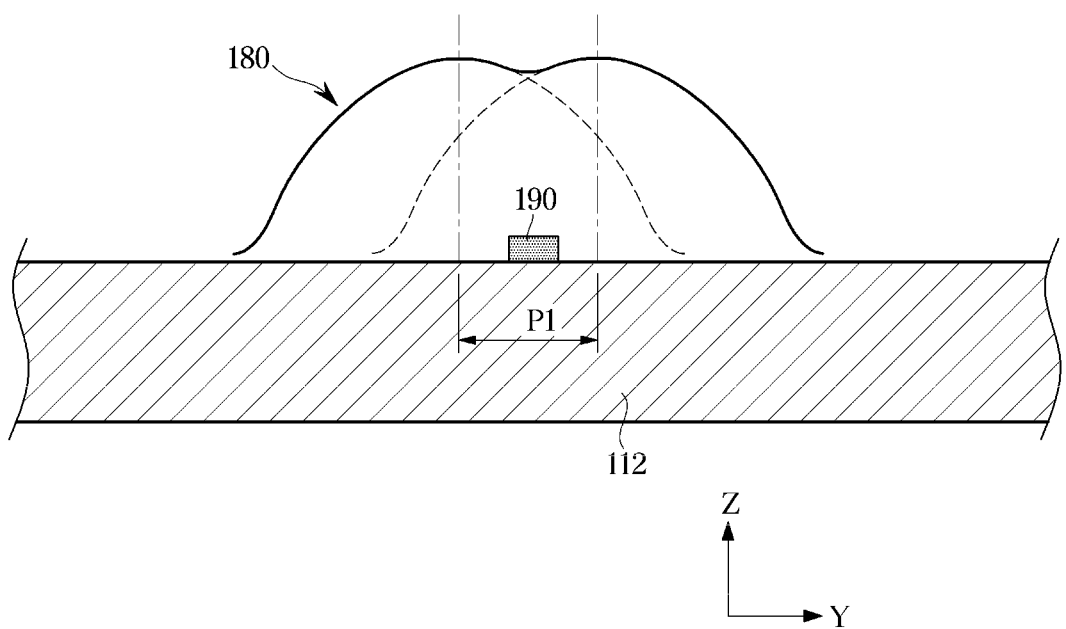
FIG. 19 is a diagram of a case of dispensing a transparent material at two points separated from each other by distance P1 to form a first refractive surface of the refractive cover in a concave shape, according to an embodiment of the disclosure.

FIG. 19 is a diagram of a case of dispensing a transparent material at two points separated from each other by distance P1 to form a first refractive surface of the refractive cover in a concave shape, according to an embodiment of the disclosure.

Referring to FIG. 19, the refractive cover 180 with the first refractive surface in the concave shape may be formed by hardening the transparent materials in the liquid state dispensed from the respective first and second dispensers separated by distance P1. In this case, the refractive cover 180 shown in FIG. 19 may be formed by adjusting the thixotropic property of the transparent material, the dispensing amount, and the distance P1.

Figure 20:
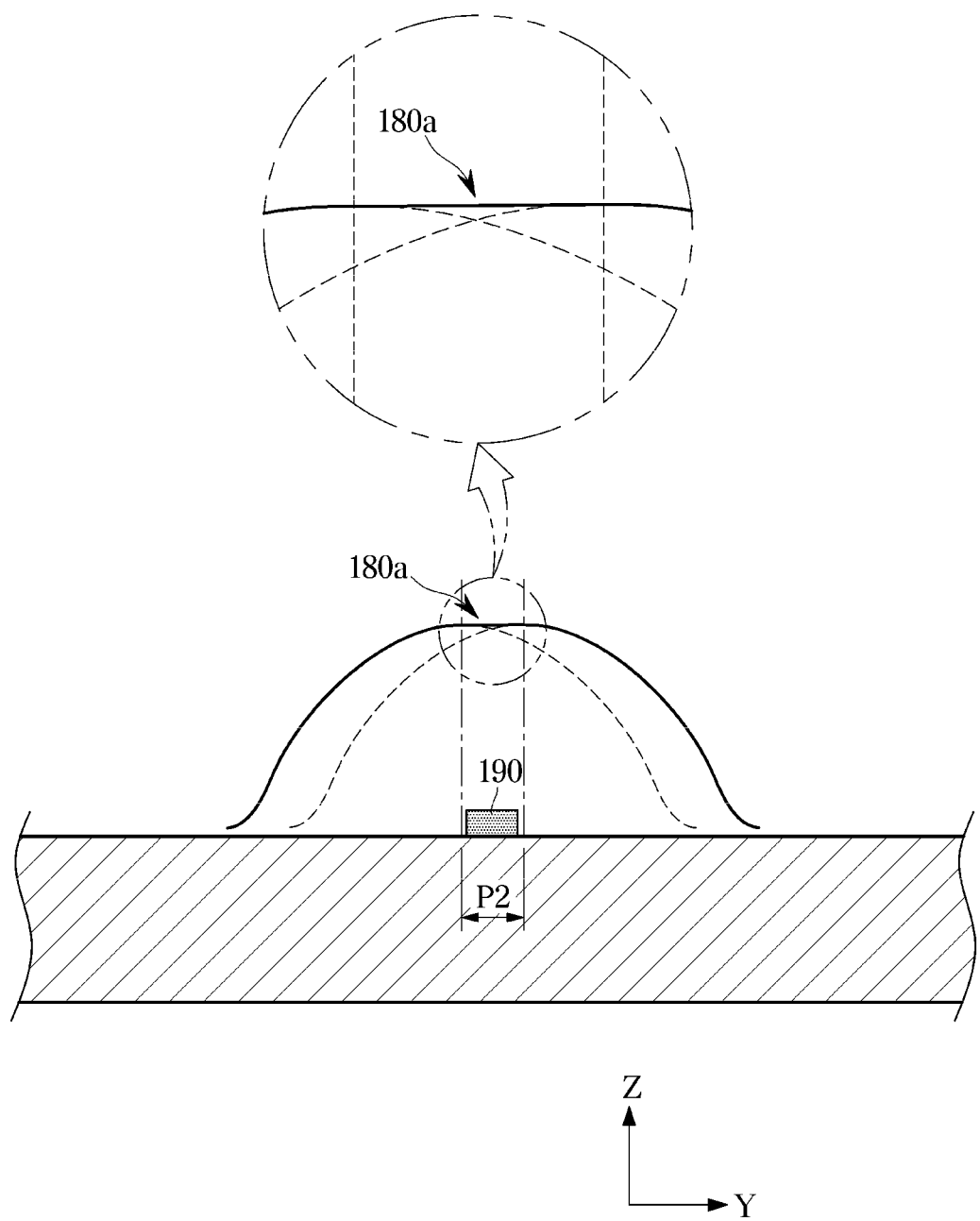
FIG. 20 is a diagram of a case of dispensing a transparent material at two points separated from each other by distance P2 to form a first refractive surface of the refractive cover in a plane, according to an embodiment of the disclosure.

FIG. 20 is a diagram of a case of dispensing a transparent material at two points separated from each other by distance P2 to form a first refractive surface of the refractive cover in a plane, according to an embodiment of the disclosure.

Referring to FIG. 20, the refractive cover 180a with the first refractive surface in a flat plane may be formed by hardening the transparent materials in the liquid state dispensed from the respective first and second dispensers separated by distance P2. In this case, the refractive cover 180a shown in FIG. 20 may be formed by adjusting the thixotropic property of the transparent material, the dispensing amount, and the distance P2.

With the same thixotropic property and dispensing amount of the transparent material, P2 may be smaller than P1.

Figure 21:
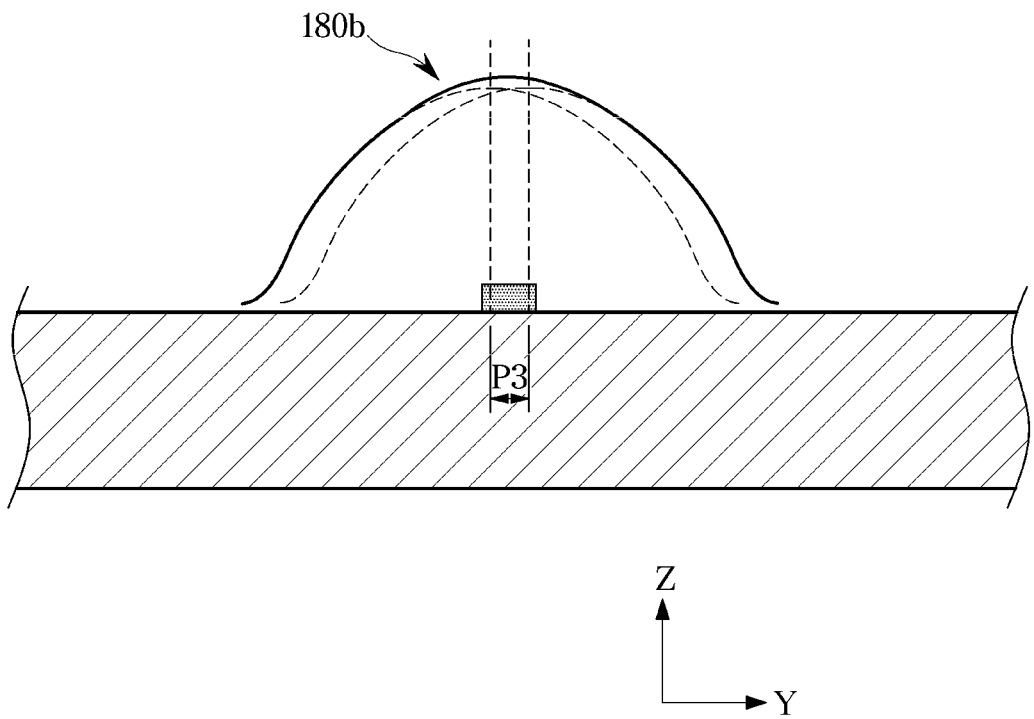
FIG. 21 is a diagram of a case of dispensing a transparent material at two points separated from each other by distance P3 to form a first refractive surface of the refractive cover in a convex shape, according to an embodiment of the disclosure.

FIG. 21 is a diagram of a case of dispensing a transparent material at two points separated from each other by distance P3 to form a first refractive surface of the refractive cover in a convex shape, according to an embodiment of the disclosure.

Referring to FIG. 21, the refractive cover 180b with the first refractive surface in the convex shape may be formed by hardening the transparent materials in the liquid state dispensed from the respective first and second dispensers separated by distance P3. In this case, the refractive cover 180b shown in FIG. 21 may be formed by adjusting the thixotropic property of the transparent material, the dispensing amount, and the distance P3.

With the same thixotropic property and dispensing amount of the transparent material, P3 may be smaller than P2.

Figure 22:
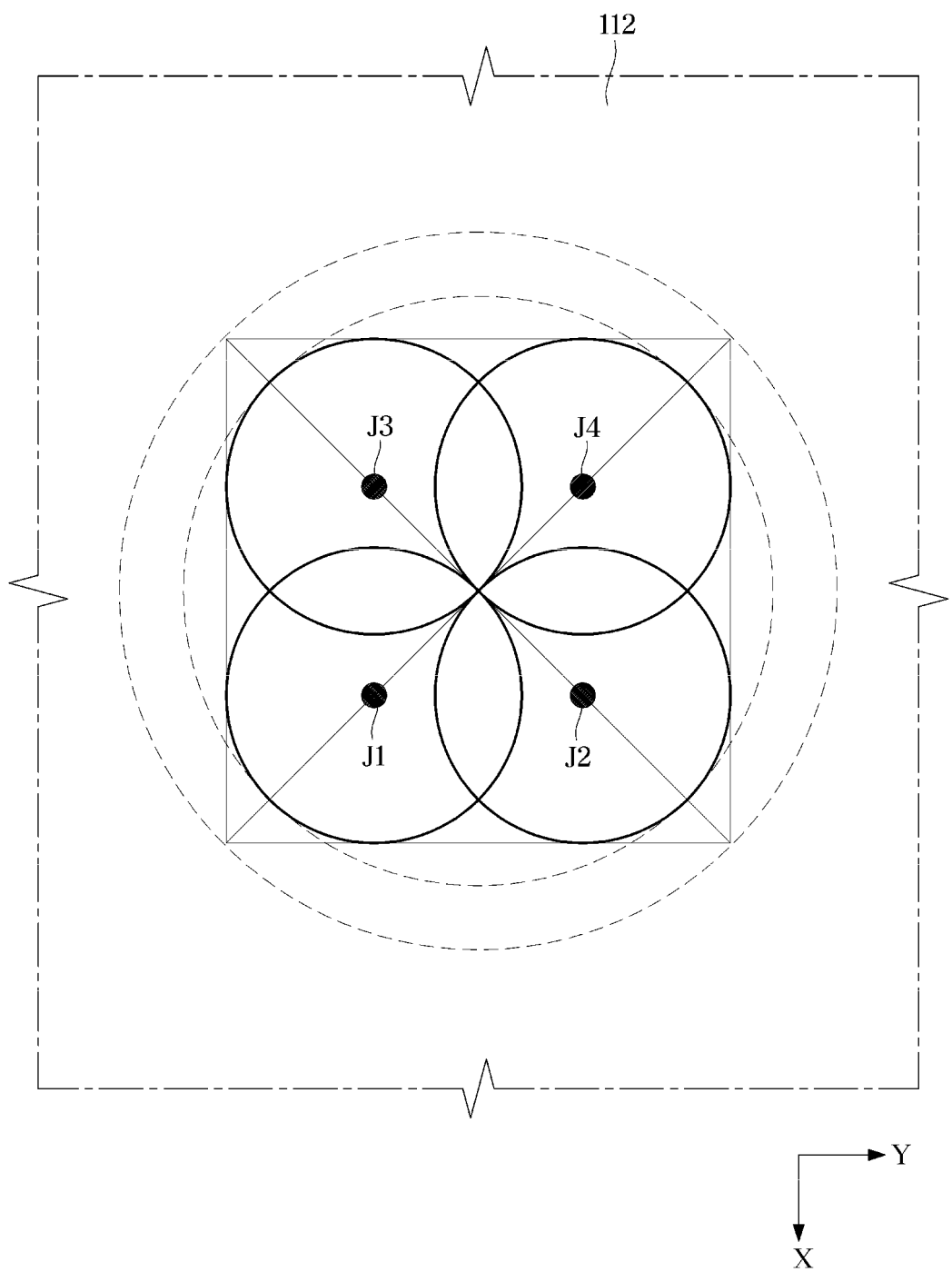
FIG. 22 is a diagram of a case of dispensing a transparent material at four points separated from each other to form a refractive cover, according to an embodiment of the disclosure.

FIG. 22 is a diagram of a case of dispensing a transparent material at four points separated from each other to form a refractive cover, according to an embodiment of the disclosure.

Referring to FIG. 22, when a transparent material is dispensed at four points separated by the same distance from each other, the refractive cover may have rotational symmetry around the central axis.

Figure 23:
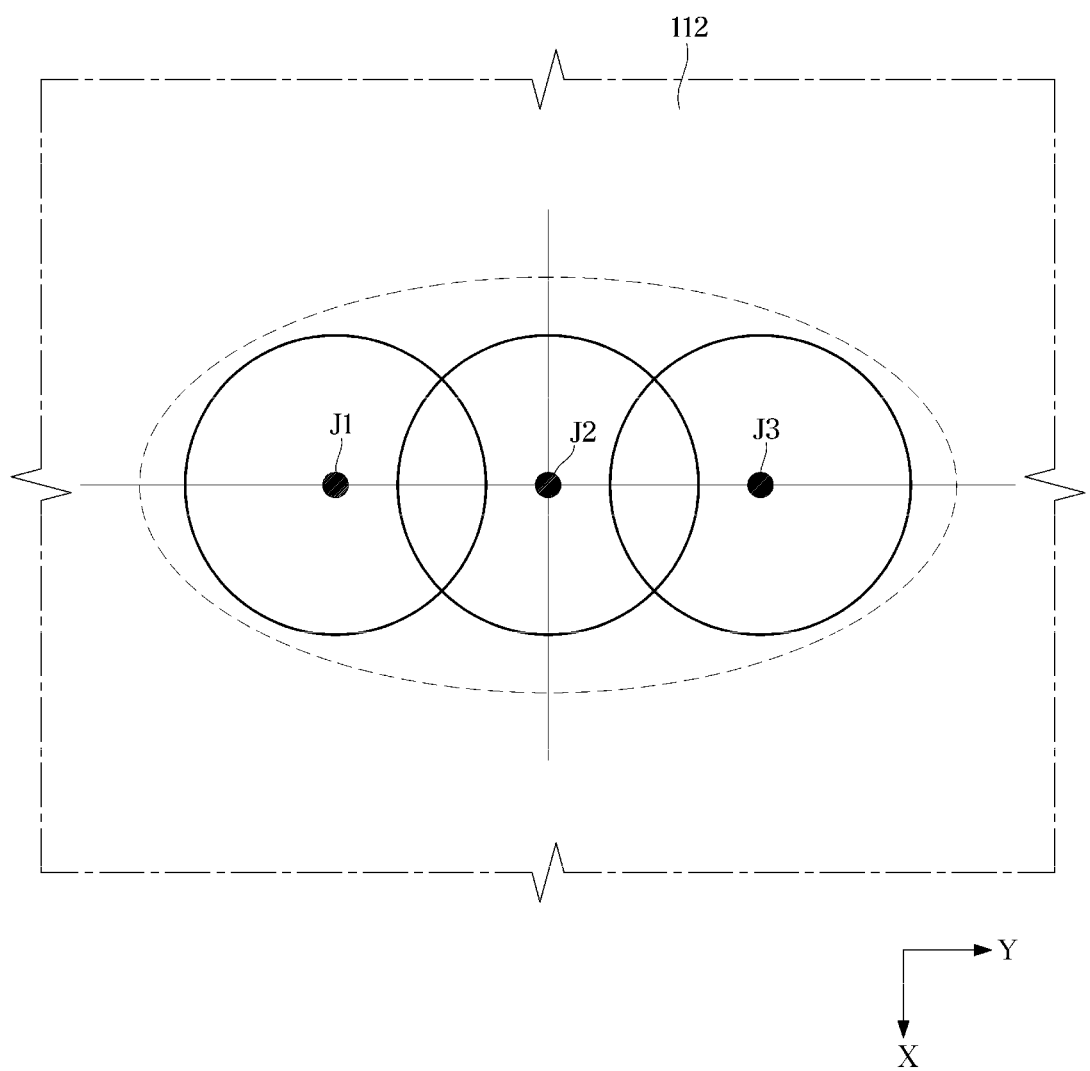
FIG. 23 is a diagram of a case of dispensing a transparent material at three points separated from each other to form a refractive cover, according to an embodiment of the disclosure.
Figure 24:
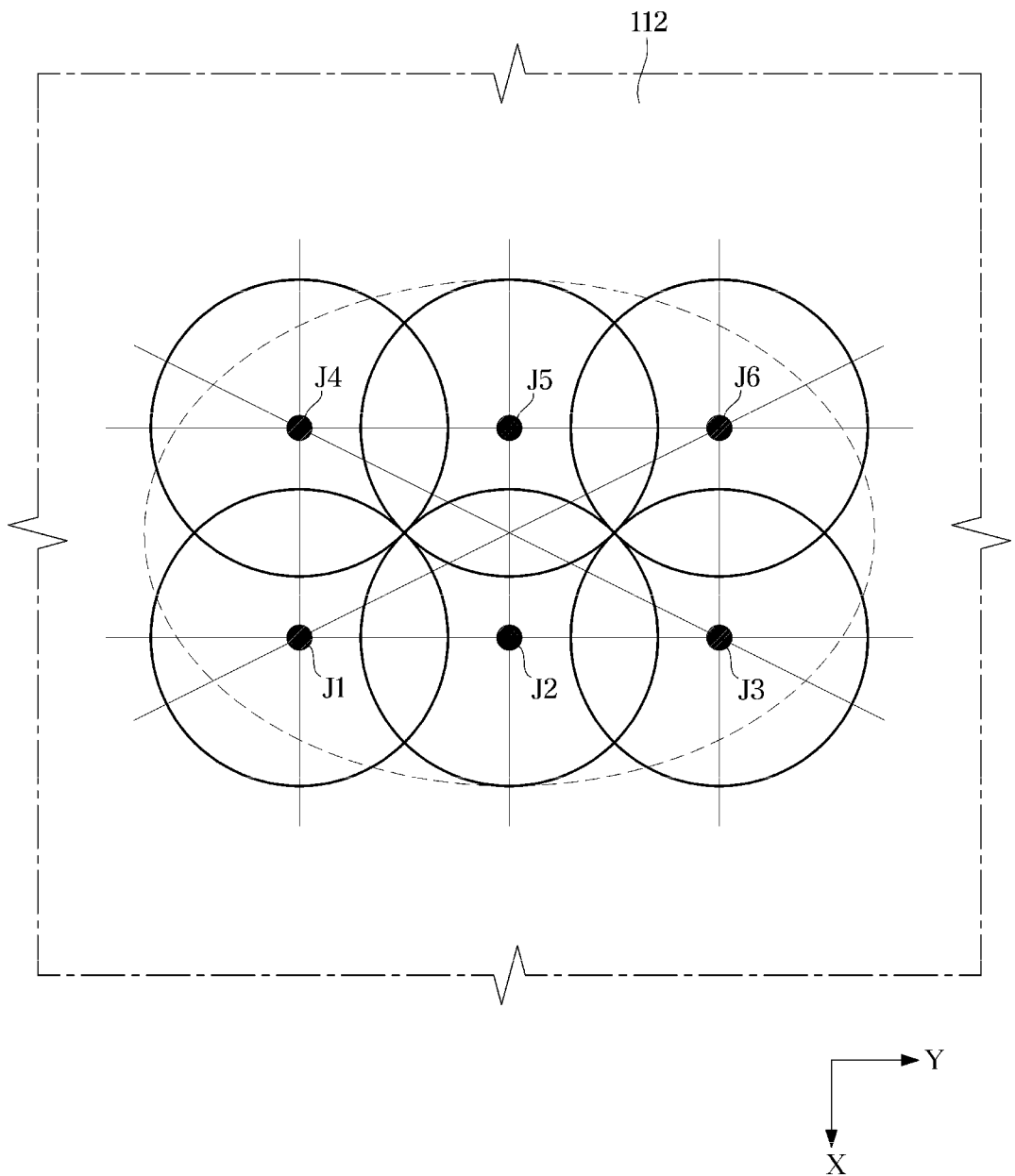
FIG. 24 is a diagram of a case of dispensing a transparent material at six points separated from each other to form a refractive cover, according to an embodiment of the disclosure.

FIG. 23 is a diagram of a case of dispensing a transparent material at three points separated from each other to form a refractive cover, according to an embodiment of the disclosure. FIG. 24 is a diagram of a case of dispensing a transparent material at six points separated from each other to form a refractive cover, according to an embodiment of the disclosure.

Referring to FIGS. 23 and 24, the number and arrangement of dispensers for dispensing transparent materials may be variously set. Three dispensers may be arranged in a line at the same intervals as shown in FIG. 23, and six dispensers may be arranged in two lines at the same intervals as shown in FIG. 24. What are shown in the drawings are merely examples, and the number and arrangement of dispensers may be variously changed depending on the intent of the designer and the shape of the refractive cover to be implemented.

According to the disclosure, provided is a display apparatus including an LED with a DBR layer arranged on top of the LED in order to have light emission distribution at high directivity angles, and a refractive cover covering the LED to protect the LED and enhance light extraction efficiency and light diffusion performance of the LED.

According to the disclosure, provided is a display apparatus having a refractive cover formed by dispensing a transparent material in a liquid state at multiple points and hardening the transparent material dispensed, thereby having reduced material costs and improved productivity.

According to the disclosure, provided is a display apparatus including a backlight unit that uses a refractive cover to provide uniform backlight without mura even with a short optical distance (OD).

Several embodiments of the disclosure have been described above, but a person of ordinary skill in the art will understand and appreciate that various modifications can be made without departing from the scope of the disclosure. Thus, it will be apparent to those or ordinary skill in the art that the true scope of technical protection is only defined by the following claims.

What is claimed is:

1. A display apparatus comprising:
    a liquid crystal panel; and
    a backlight unit configured to emit light to the liquid crystal panel,
    wherein the backlight unit comprises:
        a substrate,
        a light emitting diode (LED) provided on the substrate and configured to emit light,
        a refractive cover formed by being dispensed at a plurality of points separated from each other, and configured to enclose the LED; and
        a reflector enclosed by the refractive cover, the reflector comprising:
            a first reflection pattern provided on the substrate having a first area; and
            a second reflection pattern provided on the first reflection pattern and having a second area that is less than the first area of the first reflection pattern.

2. The display apparatus of claim 1, wherein the refractive cover is further formed by dispensing and hardening a transparent material in a liquid state at the plurality of points.

3. The display apparatus of claim 2, wherein the transparent material comprises a refraction index greater than air.

4. The display apparatus of claim 1, wherein the reflector is provided along at least one edge of the refractive cover on the substrate.

5. The display apparatus of claim 4, wherein the
    first reflection pattern is formed by applying a photo solder resist (PSR) on the substrate, and
    wherein the second reflection pattern is formed by applying the PSR on the first reflection pattern.

6. The display apparatus of claim 4, wherein the reflector comprises an inclined surface with decreasing height toward the LED such that the reflector is configured to reflect light emitted from the LED, the light emitted from the LED comprising a directivity angle equal to or larger than a certain angle in a forward direction of the substrate.

7. The display apparatus of claim 4, wherein a maximum height of the reflector is equal to or less than a tenth of height of the refractive cover at a central axis of the LED.

8. The display apparatus of claim 1, further comprising a plurality of LEDs provided on a top surface of the substrate to form an array and a plurality of refractive covers configured to enclose the plurality of LEDs, respectively.

9. The display apparatus of claim 8, wherein a first distance between first neighboring LEDs of the plurality of LEDs in a first direction is different from a second distance between second neighboring LEDs of the plurality of LEDs in a second direction perpendicular to the first direction.

10. The display apparatus of claim 1, wherein the refractive cover is rotationally asymmetric such that a diffusion ratio of light emitted from the LED in a first direction is different from a diffusion ratio in a second direction perpendicular to the first direction.

11. The display apparatus of claim 1, wherein the refractive cover comprises:
    a first refractive surface comprising an increasing height that increases toward a central axis of the LED, and
    a second refractive surface configured to be connected to the first refractive surface and comprising a decreasing height that decreases toward the central axis of the LED.

12. The display apparatus of claim 11, wherein a ray comprising a highest light intensity among rays emitted from the LED penetrates the second refractive surface.

13. The display apparatus of claim 11, wherein a ray comprising half of a highest light intensity among rays emitted from the LED penetrates the first refractive surface.

14. The display apparatus of claim 1, wherein the LED comprises a distributed Bragg reflector (DBR) layer provided on top of the LED.

* * * * *